(12) United States Patent
Kitagawa et al.

(10) Patent No.: US 12,705,865 B2
(45) Date of Patent: Aug. 11, 2026

(54) DATA CREATION SYSTEM, LEARNING SYSTEM, ESTIMATION SYSTEM, PROCESSING DEVICE, EVALUATION SYSTEM, DATA CREATION METHOD, AND PROGRAM

(71) Applicant: Panasonic Intellectual Property Management Co., Ltd., Osaka (JP)

(72) Inventors: Yuto Kitagawa, Osaka (JP); Taichi Sato, Kyoto (JP); Ryosuke Goto, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 533 days.

(21) Appl. No.: 18/249,918

(22) PCT Filed: Nov. 5, 2021

(86) PCT No.: PCT/JP2021/040713
§ 371 (c)(1),
(2) Date: Apr. 20, 2023

(87) PCT Pub. No.: WO2022/102522
PCT Pub. Date: May 19, 2022

(65) Prior Publication Data

US 2023/0386182 A1 Nov. 30, 2023

(30) Foreign Application Priority Data

Nov. 10, 2020 (JP) ................................ 2020-187508

(51) Int. Cl.
*G06V 10/774* (2022.01)
*G06T 3/40* (2006.01)
(Continued)

(52) U.S. Cl.
CPC .............. *G06V 10/774* (2022.01); *G06T 3/40* (2013.01); *G06T 7/13* (2017.01); *G06V 10/761* (2022.01)

(58) Field of Classification Search
CPC .... G06V 10/774; G06V 10/761; G06V 10/25; G06V 10/82; G06T 3/40; G06T 7/13;
(Continued)

(56) References Cited

U.S. PATENT DOCUMENTS 4,680,014 A * 7/1987 Paton .................... G09B 19/24
434/234
5,848,201 A * 12/1998 Kajiwara ................ G09G 5/14
382/296
(Continued)

FOREIGN PATENT DOCUMENTS

EP 3 900 870 A1 10/2021
JP 2017-045441 A 3/2017
(Continued)

OTHER PUBLICATIONS

Yoshida et al., WO 2020/129617 (Published on Jun. 25, 2020) WIPO PatentScope Translation (Year: 2020).*
(Continued)

*Primary Examiner* — Aaron W Carter
(74) *Attorney, Agent, or Firm* — Rimon P.C.

(57) ABSTRACT

A data creation system creates, based on first image data, second image data for use as learning data. A processor of the data creation system generates, based on the first image data including a first region as a pixel region representing the object and a second region adjacent to the first region, the second image data by causing deformation about height of the first region with respect to a reference plane. The processor generates the second image data such that the closer to a reference point within the first region a point of
(Continued)

interest is, the greater a variation in the height of the first region with respect to the reference plane is and the closer to a boundary between the first region and the second region the point of interest is, the smaller the variation in the height of the first region with respect to the reference plane is.

21 Claims, 14 Drawing Sheets

(51) Int. Cl.
*G06T 7/13* (2017.01)
*G06V 10/74* (2022.01)

(58) Field of Classification Search
CPC . G06T 2207/20081; G06T 2207/20084; G06T 2207/30136; G06T 2207/30152; G06T 7/0004; G06T 7/00
See application file for complete search history.

(56) References Cited

U.S. PATENT DOCUMENTS 10,909,349 B1 2/2021 Tripathi et al.
11,210,513 B2 12/2021 Endoh et al.
11,216,971 B2 1/2022 Xu et al.
11,276,179 B2 3/2022 Morales Morales et al.
11,460,857 B1 10/2022 Tan et al.
11,586,848 B2 2/2023 Yun et al.
11,681,046 B2 6/2023 Dudzik et al.
11,682,191 B2 6/2023 Shlens et al.
12,183,047 B2 12/2024 Bhanushali et al.
2003/0030749 A1* 2/2003 Kondo ................. H04N 7/0125 348/E5.065
2008/0107345 A1 5/2008 Melikian
2009/0097711 A1* 4/2009 Chen .................... G06V 40/161 348/240.99
2013/0150717 A1* 6/2013 Sato ....................... A61B 8/466 600/443
2018/0082106 A1 3/2018 Inaba et al.
2019/0130232 A1* 5/2019 Kaasila .................. G06N 3/096
2019/0139213 A1 5/2019 Kurita et al.
2019/0188846 A1 6/2019 Tamai
2019/0197356 A1 6/2019 Kurita et al.
2020/0026947 A1* 1/2020 Kuhlmann ............. G06V 10/82
2020/0211169 A1 7/2020 Tsutsumi
2022/0044147 A1 2/2022 Sato et al.
2023/0206590 A1* 6/2023 Waheed ................. G06V 10/82 382/103
2023/0274407 A1* 8/2023 Kommareddy ...... B23K 31/125 382/141
2023/0311330 A1* 10/2023 Burns .................... B25J 9/1697 700/231
2023/0386181 A1 11/2023 Sato et al.
2023/0386182 A1* 11/2023 Kitagawa ............. G06V 10/761
2023/0394797 A1* 12/2023 Goto .................... G06V 10/772
2023/0394798 A1 12/2023 Sato et al.
2024/0282085 A1* 8/2024 Kondo ................. G06V 10/774
2025/0104194 A1* 3/2025 Hiasa ......................... G06T 5/50
2025/0130176 A1* 4/2025 Pearson ................. G01N 21/90
2025/0191346 A1* 6/2025 Sato ..................... G06V 10/945
2025/0225644 A1* 7/2025 Mitsumoto .......... G06V 10/764
2025/0329146 A1* 10/2025 Furusawa ........... G06V 10/774

FOREIGN PATENT DOCUMENTS

JP 2018-045608 A 3/2018
JP 2019-106112 A 6/2019
JP 2019-114116 A 7/2019
JP 2020-014799 A 1/2020
JP 2020-106461 A 7/2020
WO 2020/070876 A1 4/2020
WO 2020/129617 A1 6/2020

OTHER PUBLICATIONS

Office Action issued in the the related Chinese Patent Application No. 202180070302.4, dated Jun. 30, 2025, with Partial English Translation of the Front Page and Search Report.
Office Action issued in the related U.S. Appl. No. 18/249,928, dated May 15, 2025.
Office Action issued in the related U.S. Appl. No. 18/249,895, dated Jul. 24, 2025.
International Search Report dated Jan. 25, 2022 issued in International Patent Application No. PCT/JP2021/040713, with English translation.
International Search Report dated Jan. 25, 2022 issued in International Patent Application No. PCT/JP2021/040714, with English translation.
International Search Report dated Feb. 1, 2022 issued in International Patent Application No. PCT/JP2021/040715, with English translation.
International Search Report dated Feb. 1, 2022 issued in International Patent Application No. PCT/JP2021/040716, with English translation.
Ito Hidemasa, "Deep Learning Data Augmentation Technique to Improve Image Recognition Accuracy", Toshiba's New SPINEX IoT Architecture Reinforcing Digital Transformation, vol. 72 No. 4, Toshiba Review, Sep. 30, 2017 with English Abstract.

* cited by examiner

A1
A2
A
B10
B11
B12
B13
B14
C1
(C11)
(C12)
C110
C120
D11
D12
P1
V1
4
51
52
(521)
(522)
X
Y
Z

START
S1
Acquire first image data
S2
Extract region information
S3
Extract particular region
(undercut)
S4
Set reference point and boundaries
S5
Determine height variation
(except particular region)
S6
Generate second image data
by causing height deformation
S7
Output second image data
END 100
Evaluation System
Image Capture Device
6
Object to Be Recognized Image Data
D3
Reference Image Data
D4
First Image Data
D11
1
Data Creation System
10
Acquirer
11 (18)
Deformer
12
Determiner
13
Communications Interface
15
Display Device
16
Operating Member
17 (18)
Second Image Data
D12
Learning Data (Image Data)
D1
Learning System
2
Learned Model
M1
Estimation System
3
Recognition Result

DATA CREATION SYSTEM, LEARNING SYSTEM, ESTIMATION SYSTEM, PROCESSING DEVICE, EVALUATION SYSTEM, DATA CREATION METHOD, AND PROGRAM

CROSS-REFERENCE OF RELATED APPLICATIONS

This application is the U.S. National Phase under 35 U.S.C. § 371 of International Patent Application No. PCT/JP2021/040713, filed on Nov. 5, 2021, which in turn claims the benefit of Japanese Patent Application No. 2020-187508, filed on Nov. 10, 2020, the entire disclosures of which Applications are incorporated by reference herein.

TECHNICAL FIELD

The present disclosure generally relates to a data creation system, a learning system, an estimation system, a processing device, an evaluation system, a data creation method, and a program. More particularly, the present disclosure relates to a data creation system for creating image data for use as learning data to generate a learned model about an object, a learning system for generating the learned model, and an estimation system that uses the learned model. The present disclosure also relates to a processing device for use in the data creation system and an evaluation system including the processing device. The present disclosure further relates to a data creation method and program for creating image data for use as learning data to generate a learned model about an object.

BACKGROUND ART

Patent Literature 1 discloses a training data augmentation device. Patent Literature 1 teaches shortening the time it takes to collect data by decreasing the amount of data to collect in a real environment for the purpose of machine learning.

Patent Literature 1 also teaches how the training data augmentation device generates new training data based on real training data of an apple and real training data of a pear in combination with feature quantities representing their hues within the luminance range when the apple and pear are shot at stores A, B, and C.

Simply changing the combination of an overall luminance value and hue of an object (such as the apple or pear) as in the training data augmentation device of Patent Literature 1 may be insufficient as a technique for creating a wide variety of learning data when an object needs to be recognized locally. Consequently, this may cause a decline in the performance of recognizing the object.

CITATION LIST

Patent Literature

Patent Literature 1: WO 2020/070876 A1

SUMMARY OF INVENTION

In view of the foregoing background, it is therefore an object of the present disclosure to provide a data creation system, a learning system, an estimation system, a processing device, an evaluation system, a data creation method, and a program, all of which are configured or designed to improve the performance of recognizing an object.

A data creation system according to an aspect of the present disclosure creates, based on first image data, second image data for use as learning data to generate a learned model about an object. The data creation system includes a processor. The processor generates, based on the first image data including a first region as a pixel region representing the object and a second region adjacent to the first region, the second image data by causing deformation about height of the first region such that the closer to a reference point within the first region a point of interest is, the greater a variation in height of the first region with respect to a reference plane is and the closer to a boundary between the first region and the second region the point of interest is, the smaller the variation in the height of the first region with respect to the reference plane is.

Another data creation system according to another aspect of the present disclosure creates, based on first image data and reference image data, second image data for use as learning data to generate a learned model about an object. The data creation system includes a processor. The processor generates, based on the first image data including a first region as a pixel region representing the object and a second region adjacent to the first region, the second image data by causing deformation about height of the second region with respect to a first reference plane based on height of a fourth region of the reference image data with respect to a second reference plane. The reference image data includes a third region as a pixel region representing the object and the fourth region adjacent to the third region. When a distance from an outer edge of the second region to a first reference point in the second region is a first distance, a distance from a boundary between the first region and the second region to the first reference point is a second distance, and a location where a ratio of the first distance to the second distance on the second reference plane is satisfied in the fourth region of the reference image data is a second reference point, a variation at the first reference point is a quantity based on height at the second reference point with respect to the second reference plane.

A learning system according to still another aspect of the present disclosure generates the learned model using a learning data set. The learning data set includes the learning data as the second image data created by any of the data creation systems described above.

An estimation system according to yet another aspect of the present disclosure estimates a particular condition of the object as an object to be recognized using the learned model generated by the learning system described above.

Another data creation system according to yet another aspect of the present disclosure creates, based on first image data, second image data for use as learning data to generate a learned model about an object. The data creation system includes a determiner and a deformer. The determiner determines, with respect to the first image data including a first region as a pixel region representing the object and a second region adjacent to the first region, a height variation as a variation in height of the first region with respect to a reference plane such that the closer to a reference point within the first region a point of interest is, the greater the height variation is and the closer to a boundary between the first region and the second region the point of interest is, the smaller the height variation is. The deformer generates, based on the height variation determined by the determiner, the second image data by causing deformation about the height of the first region to the first image data.

A processing device according to yet another aspect of the present disclosure functions as a first processing device out of the first processing device and a second processing device of the data creation system described above. The first processing device includes the determiner. The second processing device includes the deformer.

Another processing device according to yet another aspect of the present disclosure functions as a second processing device out of a first processing device and the second processing device of the data creation system described above. The first processing device includes the determiner. The second processing device includes the deformer.

An evaluation system according to yet another aspect of the present disclosure includes a processing device and a learning system. The processing device determines, based on first image data including a first region as a pixel region representing an object and a second region adjacent to the first region, a height variation as a variation in height of the first region with respect to a reference plane such that the closer to a reference point within the first region a point of interest is, the greater the height variation is and the closer to a boundary between the first region and the second region the point of interest is, the smaller the height variation is. The processing device outputs information indicating the height variation thus determined. The learning system generates a learned model. The learned model outputs, in response to either second image data or the first region in the second image data, an estimation result similar to a situation where the first image data is subjected to estimation made about a particular condition of the object. The second image data is generated, based on the height variation, by causing deformation about the first region to the first image data.

Another evaluation system according to yet another aspect of the present disclosure includes a processing device and an estimation system. The processing device determines, based on first image data including a first region as a pixel region representing an object and a second region adjacent to the first region, a height variation as a variation in height of the first region with respect to a reference plane such that the closer to a reference point within the first region a point of interest is, the greater the height variation is and the closer to a boundary between the first region and the second region the point of interest is, the smaller the height variation is. The processing device outputs information indicating the height variation thus determined. The estimation system estimates a particular condition of the object as an object to be recognized using the learned model. The learned model outputs, in response to either second image data or the first region in the second image data, an estimation result similar to a situation where the first image data is subjected to estimation made about the particular condition of the object. The second image data is generated, based on the height variation, by causing deformation about the first region to the first image data.

Another data creation system according to yet another aspect of the present disclosure creates, based on first image data and reference image data, second image data for use as learning data to generate a learned model about an object. The first image data includes: a first region as a pixel region representing the object; a second region adjacent to the first region; and a first reference plane. The reference image data includes: a third region as a pixel region representing the object; a fourth region adjacent to the third region; and a second reference plane. The data creation system includes a determiner and a deformer. The determiner determines, based on height of the fourth region of the reference image data with respect to the second reference plane of the reference image data, a height variation as a variation in the height. The deformer generates, based on the height variation determined by the determiner, the second image data by causing deformation about the height of the second region with respect to the first reference plane to the first image data. When a distance from an outer edge of the second region to a first reference point in the second region is a first distance, a distance from a boundary between the first region and the second region to the first reference point is a second distance, and a location where a ratio of the first distance to the second distance on the second reference plane is satisfied in the fourth region of the reference image data is a second reference point, the determiner determines the height variation such that a variation at the first reference point is a quantity based on height at the second reference point with respect to the second reference plane.

Another processing device according to yet another aspect of the present disclosure functions as a first processing device out of the first processing device and a second processing device of the data creation system described above. The first processing device includes the determiner. The second processing device includes the deformer.

Another processing device according to yet another aspect of the present disclosure functions as a second processing device out of a first processing device and the second processing device of the data creation system described above. The first processing device includes the determiner. The second processing device includes the deformer.

Another evaluation system according to yet another aspect of the present disclosure includes a processing device and a learning system. The processing device determines, with respect to first image data, including a first region as a pixel region representing an object, a second region adjacent to the first region, and a first reference plane, and reference image data, including a third region as a pixel region representing the object, a fourth region adjacent to the third region, and a second reference plane, a height variation as a variation in height based on height of the fourth region with respect to the second reference plane. When a distance from an outer edge of the second region to a first reference point in the second region is a first distance, a distance from a boundary between the first region and the second region to the first reference point is a second distance, and a location where a ratio of the first distance to the second distance on the second reference plane is satisfied in the fourth region of the reference image data is a second reference point, the processing device determines the height variation such that a variation at the first reference point is a quantity based on height at the second reference point with respect to the second reference plane. The processing device outputs information indicating the height variation thus determined. The learning system generates a learned model. The learned model outputs, in response to either second image data or the first region in the second image data, an estimation result similar to a situation where the first image data is subjected to estimation made about a particular condition of the object. The second image data is generated based on the height variation by causing deformation about the second region to the first image data.

Another evaluation system according to yet another aspect of the present disclosure includes a processing device and an estimation system. The processing device determines, with respect to first image data, including a first region as a pixel region representing an object, a second region adjacent to the first region, and a first reference plane, and reference image data, including a third region as a pixel region representing the object, a fourth region adjacent to the third region, and a second reference plane, a height variation as a variation in height based on height of the fourth region with respect to the second reference plane. When a distance from an outer edge of the second region to a first reference point in the second region is a first distance, a distance from a boundary between the first region and the second region to the first reference point is a second distance, and a location where a ratio of the first distance to the second distance on the second reference plane is satisfied in the fourth region of the reference image data is a second reference point, the processing device determines the height variation such that a variation at the first reference point is a quantity based on height at the second reference point with respect to the second reference plane. The processing device outputs information indicating the height variation thus determined. The estimation system estimates a particular condition of the object as an object to be recognized using the learned model. The learned model outputs, in response to either second image data or the first region in the second image data, an estimation result similar to that situation where the first image data is subjected to estimation made about the particular condition of the object. The second image data is generated based on the height variation by causing deformation about the second region to the first image data.

A data creation method according to yet another aspect of the present disclosure is a method for creating, based on first image data, second image data for use as learning data to generate a learned model about an object. The data creation method includes a processing step. The processing step includes generating, based on the first image data including a first region as a pixel region representing the object and a second region adjacent to the first region, the second image data by causing deformation about height of the first region such that the closer to a reference point within the first region a point of interest is, the greater a variation in height of the first region with respect to a reference plane is and the closer to a boundary between the first region and the second region the point of interest is, the smaller the variation in the height of the first region with respect to the reference plane is.

Another data creation method according to yet another aspect of the present disclosure is a method for creating, based on first image data and reference image data, second image data for use as learning data to generate a learned model about an object. The data creation method includes a processing step. The processing step includes generating, based on the first image data including a first region as a pixel region representing the object and a second region adjacent to the first region, the second image data by causing deformation about height of the second region with respect to a first reference plane based on height of a fourth region of the reference image data with respect to a second reference plane. The reference image data includes a third region as a pixel region representing the object and the fourth region adjacent to the third region. When a distance from an outer edge of the second region to a first reference point in the second region is a first distance, a distance from a boundary between the first region and the second region to the first reference point is a second distance, and a location where a ratio of the first distance to the second distance on the second reference plane is satisfied in the fourth region of the reference image data is a second reference point, a variation at the first reference point is a quantity based on height at the second reference point with respect to the second reference plane.

A program according to yet another aspect of the present disclosure is designed to cause one or more processors to perform any of the data creation methods described above.

DESCRIPTION OF EMBODIMENTS

(1) Overview

The drawings to be referred to in the following description of embodiments are all schematic representations. Thus, the ratio of the dimensions (including thicknesses) of respective constituent elements illustrated on the drawings does not always reflect their actual dimensional ratio.

Figure 1:
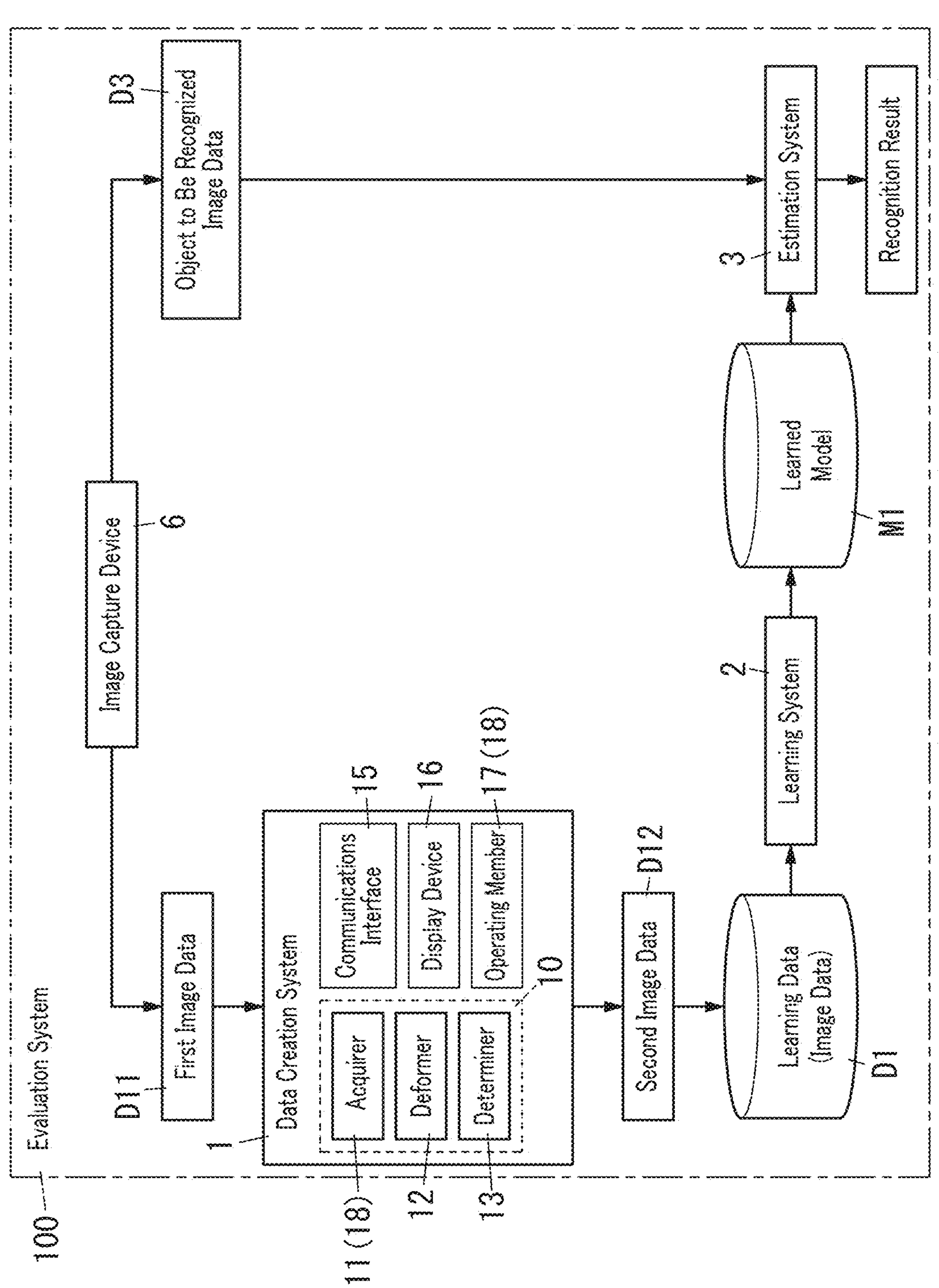
FIG. 1 is a block diagram illustrating a schematic configuration for an overall evaluation system including a data creation system according to an exemplary embodiment.

A data creation system 1 according to an exemplary embodiment creates, based on first image data D11, second image data D12 for use as learning data to generate a learned model M1 about an object 4 (refer to FIGS. 2A, 2B, 3A, and 3B), as shown in FIG. 1. In other words, the second image data D12 is learning data for use to generate a model by machine learning. As used herein, the "model" refers to a program designed to estimate, in response to input of data about an object to be recognized (object 4), the condition of the object to be recognized and output a result of estimation (recognition result). Also, as used herein, the "learned model" refers to a model about which machine learning using learning data is completed. Furthermore, the "learning data (set)" refers to a data set including, in combination, input information (image data D1) to be entered for a model and a label attached to the input information, i.e., so-called "training data." That is to say, in this embodiment, the learned model M1 is a model about which machine learning has been done by supervised learning.

In this embodiment, the object 4 as an object to be recognized may be, for example, a bead B10 as shown in FIGS. 2A, 2B 3A, and 3B. The bead B10 is formed, when two or more welding base materials (e.g., a first base material B11 and a second base material B12 in this example) are welded together via a metallic welding material B13, in the boundary B14 (welding spot) between the first base material B11 and the second base material B12. In FIGS. 2A, 2B 3A, and 3B, the first base material B11 and the second base material B12 are each a rectangular metallic plate as an example. The dimensions and shape of the bead B10 depend mainly on the welding material B13. Thus, when object to be recognized image data D3 covering the bead B10 is entered, the learned model M1 estimates the condition (particular condition) of the bead B10 and outputs a result of estimation. Specifically, the learned model M1 outputs, as the result of estimation, information indicating whether the bead B10 is a defective product or a non-defective (i.e., good) product and information about the type of the defect if the bead B10 is a defective product. That is to say, the learned model M1 is used to determine whether the bead B10 is a good product or not. In other words, the learned model M1 is used to conduct a weld appearance test to determine whether welding has been done properly.

Decision about whether the bead B10 is good or defective may be made depending on, for example, whether the length of the bead B10, the height of the bead B10, the angle of elevation of the bead B10, the throat depth of the bead B10, the excess metal of the bead B10, and the misalignment of the welding spot of the bead B10 (including the degree of shift of the beginning of the bead B10) fall within their respective tolerance ranges. For example, if at least one of these parameters enumerated above fails to fall within its tolerance range, then the bead B10 is determined to be a defective product. Alternatively, decision about whether the bead B10 is good or defective may also be made depending on, for example, whether the bead B10 has any undercut, whether the bead B10 has any pit, whether the bead B10 has any sputter, or whether the bead B10 has any projection. For example, if at least one of these imperfections enumerated above is spotted, then the bead B10 is determined to be a defective product.

To make machine learning about a model, a great many image data items about the objects to be recognized, including defective products, need to be collected as learning data. However, if the objects to be recognized turn out to be defective at a low frequency of occurrence, then learning data required to generate a learned model M1 with high recognizability tends to be short. Thus, to overcome this problem, machine learning about a model may be made with the number of learning data items increased by performing data augmentation processing about learning data (hereinafter referred to as either "first image data D11" or "original learning data") obtained by actually shooting the bead B10 using an image capture device 6. As used herein, the data augmentation processing refers to the processing of expanding learning data by subjecting the learning data to various types of processing (transformation processing) such as translation, scaling up or down (expansion or contraction), rotation, flipping, and addition of noise, for example.

The first image data D11 may be, for example, distance image data and includes a pixel value corresponding to a height component. The image capture device 6 includes a distance image sensor. As used herein, the "height" refers to a height with respect to a reference plane H1 (which may be a virtual plane or the surface of the base material, whichever is appropriate). In other words, the pixel value corresponding to the "height" is included, as a pixel value representing a distance from the target of shooting to the distance image sensor, in the first image data D11.

The data creation system 1 according to an implementation of this embodiment includes a processor 10 as shown in FIG. 1. The processor 10 generates, based on the first image data D11 including a first region 51 as a pixel region representing the object 4 and a second region 52 adjacent to the first region 51, the second image data D12 by causing deformation about height of the first region 51 with respect to the reference plane H1. The processor 10 generates the second image data D12 by causing deformation about height of the first region 51 such that the closer to a reference point P1 within the first region 51 a point of interest is, the greater a variation in the height of the first region 51 is and the closer to a boundary C1 between the first region 51 and the second region 52 the point of interest is, the smaller the variation in the height of the first region 51 is.

In this embodiment, the first region 51 is a pixel region representing a welding region (e.g., the bead B10) formed by welding together two base materials (namely, a first base material B11 and a second base material B12) to be welded. The second region 52 is a pixel region representing any one of the two base materials (namely, the first base material B11 or the second base material B12).

In this embodiment, the welding region (i.e., the bead B10) formed by welding the first and second base materials B11, B12 is the object 4, and therefore, there are two second regions 52 in the first image data D11. In the following description, a pixel region representing the first base material B11 will be hereinafter referred to as a "first base material region 521" and a pixel region representing the second base material B12 will be hereinafter referred to as a "second base material region 522" (refer to FIG. 4).

The reference point P1 may be a point that has been set in advance at a predetermined location within the first region 51 or a point to be set arbitrarily in accordance with a command entered by the user, whichever is appropriate.

Figures 3A, 3B:
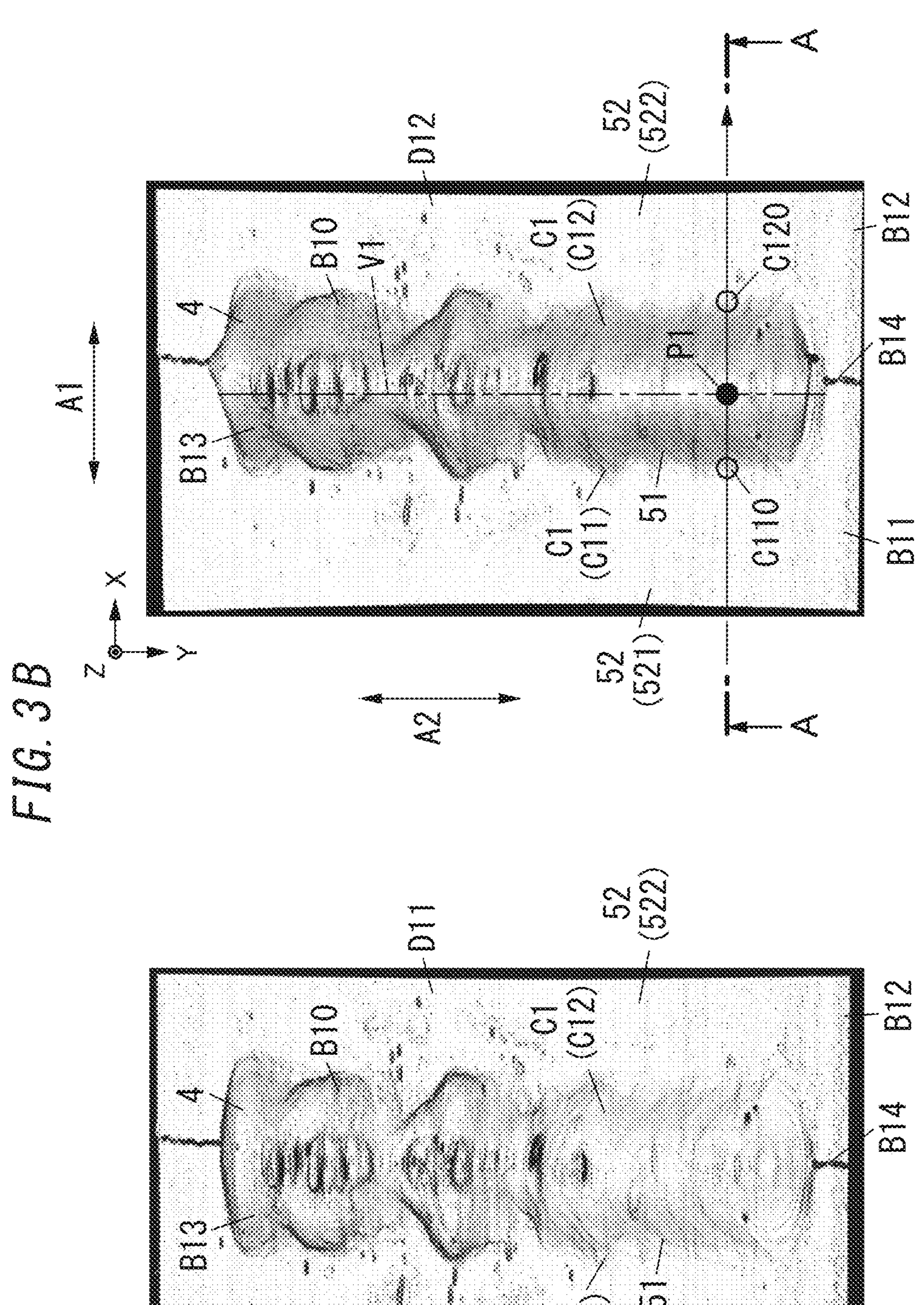
FIG. 3A shows another exemplary first image data to be input to the data creation system.
FIG. 3B shows second image data created, based on the first image data shown in FIG. 3A, by the data creation system.
Figure 4:
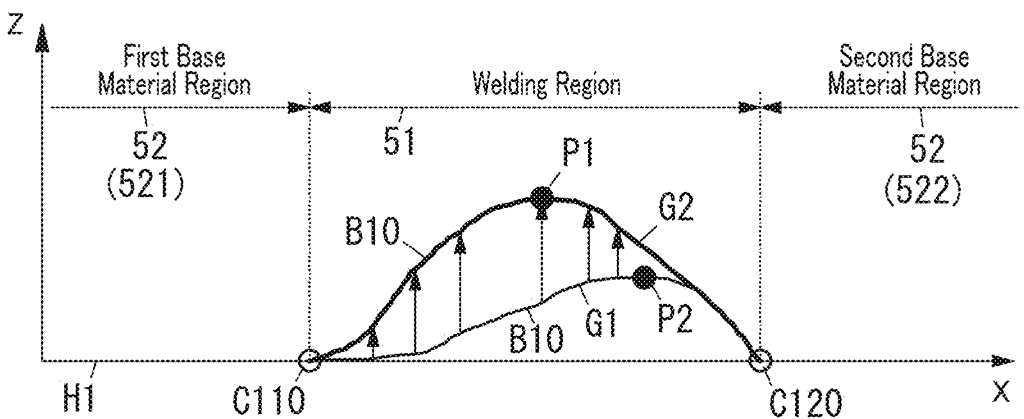
FIG. 4 shows how the data creation system performs deformation processing.

FIG. 4 schematically shows, as a second curve G2, the outline height of the bead B10 (with respect to the reference plane H1) in a cross section taken provisionally along the plane A-A in FIG. 3B, showing the second image data D12 created by causing deformation to the bead B10, the first base material B11, and second base material B12. To make the second curve G2 easily comparable, the outline height of the bead B10 yet to be deformed as shown in FIG. 3A is also shown as a first curve G1 in FIG. 4.

In this embodiment, the closer to the reference point P1 within the first region 51 a point of interest is, the greater the variation in the height of the first region 51 is and the closer to the boundary C1 between the first region 51 and the second region 52 the point of interest is, the smaller the variation in the height of the first region 51 is. This makes it easier to create second image data D12 having either a mountain shape formed by increasing the height of the first region 51 of the first image data D11 or a valley shape formed by decreasing the height of the first region 51 of the first image data D11. Consequently, this enables increasing the variety of learning data, thus contributing to improving the performance of recognizing the object 4.

Also, a learning system 2 (refer to FIG. 1) according to this embodiment generates a learned model M1 using a learning data set including learning data as the second image data D12 created by the data creation system 1. This enables providing a learning system 2 contributing to improving the performance of recognizing the object 4. The learning data for use to generate the learned model M1 may include not only the second image data D12 (augmented data) but also the original first image data D11 as well. In other words, the image data D1 according to this embodiment includes at least the second image data D12 and may include both the first image data D11 and the second image data D12.

An estimation system 3 (refer to FIG. 1) according to this embodiment estimates a particular condition of an object 4 (e.g., bead B10 in this example) as the object to be recognized using the learned model M1 generated by the learning system 2. This enables providing an estimation system 3 contributing to improving the performance of recognizing the object 4.

A data creation method according to this embodiment is a method for creating, based on first image data D11, second image data D12 for use as learning data to generate a learned model M1 about an object 4. The data creation method includes a processing step. The processing step includes generating, based on the first image data D11 including a first region 51 as a pixel region representing the object 4 and a second region 52 adjacent to the first region 51, the second image data D12 by causing deformation about height of the first region 51 with respect to a reference plane H1. The processing step includes generating the second image data D12 by causing deformation about the height of the first region 51 such that the closer to a reference point P1 within the first region 51 a point of interest is, the greater the variation in the height of the first region 51 is and the closer to a boundary C1 between the first region 51 and the second region 52 the point of interest is, the smaller the variation in the height of the first region 51 is.

This enables providing a data creation method contributing to improving the performance of recognizing the object 4. The data creation method is used on a computer system (data creation system 1). That is to say, the data creation method is also implementable as a program. A program according to this embodiment is designed to cause one or more processors to perform the data creation method according to this embodiment.

(2) Details

Next, an overall system including the data creation system 1 according to this embodiment (hereinafter referred to as an "evaluation system 100") will now be described in detail with reference to FIGS. 1-9.

(2.1) Overall Configuration

As shown in FIG. 1, the evaluation system 100 includes the data creation system 1, the learning system 2, the estimation system 3, and one or more image capture devices 6 (only one of which is shown in FIG. 1).

The data creation system 1, the learning system 2, and the estimation system 3 are supposed to be implemented as, for example, a server. The "server" as used herein is supposed to be implemented as a single server device. That is to say, major functions of the data creation system 1, the learning system 2, and the estimation system 3 are supposed to be provided for a single server device.

Alternatively, the "server" may also be implemented as a plurality of server devices. Specifically, the functions of the data creation system 1, the learning system 2, and the estimation system 3 may be provided for three different server devices, respectively. Alternatively, two out of these three systems may be provided for a single server device. Optionally, those server devices may form a cloud computing system, for example.

Furthermore, the server device may be installed either inside a factory as a place where welding is performed or outside the factory (e.g., at a service headquarters), whichever is appropriate. If the respective functions of the data creation system 1, the learning system 2, and the estimation system 3 are provided for three different server devices, then each of these server devices is preferably connected to the other server devices to be ready to communicate with the other server devices.

The data creation system 1 is configured to create image data D1 for use as learning data to generate the learned model M1 about the object 4. As used herein, to "create learning data" may refer to not only generating new learning data separately from the original learning data but also generating new learning data by updating the original learning data.

The learned model M1 as used herein may include, for example, either a model that uses a neural network or a model generated by deep learning using a multilayer neural network. Examples of the neural networks may include a convolutional neural network (CNN) and a Bayesian neural network (BNN). The learned model M1 may be implemented by, for example, installing a learned neural network into an integrated circuit such as an application specific integrated circuit (ASIC) or a field-programmable gate array (FPGA). However, the learned model M1 does not have to be a model generated by deep learning. Alternatively, the learned model M1 may also be a model generated by a support vector machine or a decision tree, for example.

In this embodiment, the data creation system 1 has the function of expanding the learning data by performing data augmentation processing on the original learning data (first image data D11) as described above. In the following description, a person who uses the evaluation system 100 including the data creation system 1 will be hereinafter simply referred to as a "user." The user may be, for example, an operator who monitors a manufacturing process such as a welding process step in a factory or a chief administrator.

As shown in FIG. 1 the data creation system 1 includes the processor 10, a communications interface 15, a display device 16, and an operating member 17.

In the example illustrated in FIG. 1, a storage device for storing the learning data (image data D1) is provided outside the data creation system 1. However, this is only an example and should not be construed as limiting. Alternatively, the data creation system 1 may further include a storage device. In that case, the storage device may also be a memory built in the processor 10. The storage device for storing the image data D1 includes a programmable nonvolatile memory such as an electrically erasable programmable read-only memory (EEPROM).

Optionally, some functions of the data creation system 1 may be distributed in a telecommunications device with the capability of communicating with the server. Examples of the "telecommunications devices" as used herein may include personal computers (including laptop computers and desktop computers) and mobile telecommunications devices such as smartphones and tablet computers. In this embodiment, the functions of the display device 16 and the operating member 17 are provided for the telecommunications device to be used by the user. A dedicated application software program allowing the telecommunications device to communicate with the server is installed in advance in the telecommunications device.

The processor 10 may be implemented as a computer system including one or more processors (microprocessors) and one or more memories. That is to say, the one or more processors may perform the functions of the processor 10 by executing one or more programs (applications) stored in the one or more memories. In this embodiment, the program is stored in advance in the memory of the processor 10. Alternatively, the program may also be downloaded via a telecommunications line such as the Internet or distributed after having been stored in a non-transitory storage medium such as a memory card.

The processor 10 performs the processing of controlling the communications interface 15, the display device 16, and the operating member 17. The functions of the processor 10 are supposed to be performed by the server. In addition, the processor 10 also has the function of performing image processing. As shown in FIG. 1, the processor 10 includes an acquirer 11, a deformer 12, and a determiner 13. The respective constituent elements of the processor 10 will be described in detail in the next section.

The display device 16 may be implemented as either a liquid crystal display or an organic electroluminescent (EL) display. The display device 16 is provided for the telecommunications device as described above. Optionally, the display device 16 may also be a touchscreen panel display. The display device 16 displays (outputs) information about the first image data D11 and the second image data D12. In addition, the display device 16 also displays various types of information about the generation of learning data besides the first image data D11 and the second image data D12.

The communications interface 15 is a communications interface for communicating with one or more image capture devices 6 either directly or indirectly via, for example, another server having the function of a production management system. In this embodiment, the function of the communications interface 15, as well as the function of the processor 10, is supposed to be provided for the same server. However, this is only an example and should not be construed as limiting. Alternatively, the function of the communications interface 15 may also be provided for the telecommunications device, for example. The communications interface 15 receives, from the image capture device(s) 6, the first image data D11 as the original learning data.

The first image data D11 may be, for example, distance image data, as described above, and includes a pixel region representing the object 4. Alternatively, the first image data D11 may also be luminance image data. As described above, the object 4 may be, for example, the bead B10 formed, when the first base material B11 and the second base material B12 are welded together via the welding material B13, in the boundary B14 between the first base material B11 and the second base material B12. That is to say, the first image data D11 is data captured by a distance image sensor of the image capture device 6 and including the pixel region representing the bead B10.

The first image data D11 is chosen as the target of the data augmentation processing in accordance with, for example, the user's command from a great many image data items about the object 4 shot with the image capture device 6. The evaluation system 100 preferably includes a user interface (which may be the operating member 17) that accepts the user's command about his or her choice.

Examples of the operating member 17 include a mouse, a keyboard, and a pointing device. The operating member 17 is provided for the telecommunications device to be used by the user as described above. If the display device 16 is a touchscreen panel display of the telecommunications device, then the display device 16 may also have the function of the operating member 17.

The learning system 2 generates the learned model M1 using a learning data set including a plurality of image data items D1 (including a plurality of second image data items D12) created by the data creation system 1. The learning data set is generated by attaching a label indicating either a good product or a defective product or a label indicating the type and location of the defect as for the defective product to each of a plurality of image data items D1. Examples of the types of defects include undercut, pit, and sputter. The work of attaching the label is performed on the evaluation system 100 by the user via a user interface such as the operating member 17. In one variation, the work of attaching the label may also be performed by a learned model having the function of attaching a label to the image data D1. The learning system 2 generates the learned model M1 by making, using the learning data set, machine learning about the conditions (including a good condition, a bad condition, the type of the defect, and the location of the defect) of the object 4 (e.g., the bead B10).

Optionally, the learning system 2 may attempt to improve the performance of the learned model M1 by making re-learning using a learning data set including newly acquired learning data. For example, if a new type of defect is found in the object 4 (e.g., the bead B10), then the learning system 2 may be made to do re-learning about the new type of defect.

The estimation system 3 estimates, using the learned model M1 generated by the learning system 2, particular conditions (including a good condition, a bad condition, the type of the defect, and the location of the defect) of the object 4 as the object to be recognized. The estimation system 3 is configured to be ready to communicate with one or more image capture devices 6 either directly or indirectly via another server having the function of a production management system. The estimation system 3 receives object to be recognized image data D3 generated by shooting the bead B10, which has been formed by actually going through a welding process step, with the image capture device 6.

The estimation system 3 determines, based on the learned model M1, whether the object 4 shot in the object to be recognized image data D3 is a good product or a defective product and estimates, if the object 4 is a defective product, the type and location of the defect. The estimation system 3 outputs the recognition result (i.e., the result of estimation) about the object to be recognized image data D3 to, for example, the telecommunications device used by the user or the production management system. This allows the user to check the result of estimation through the telecommunications device. Optionally, the production management system may control the production facility to discard a welded part that has been determined, based on the result of estimation acquired by the production management system, to be a defective product before the part is transported and subjected to the next processing step.

(2.2) Data Augmentation Processing

The processor 10 has the function of performing "deformation processing" at least about the height as a type of data augmentation processing. Specifically, the processor 10 includes the acquirer 11, the deformer 12, and the determiner 13 as shown in FIG. 1.

The acquirer 11 is configured to acquire the first image data D11 which is entered as the target of deformation. The user enters the first image data D11 as a target of deformation into the data creation system 1 via, for example, the operating member 17.

The deformer 12 generates, based on the first image data D11 including the first region 51 (welding region) and the second regions 52 (including the first and second base material regions 521, 522), the second image data D12 by causing deformation about the height of the first region 51 with respect to the reference plane H1 (in a deformation step). The deformer 12 causes the deformation about the height in accordance with a decision made by the determiner 13.

The determiner 13 determines the variation (i.e., height variation) such that the closer to the reference point P1 within the first region 51 a point of interest is, the greater the variation in the height of the first region 51 (welding region) is and the closer to the boundary C1 between the first region 51 and the second region 52 the point of interest is, the smaller the variation in the height of the first region 51 is (in a determination step).

Next, the data augmentation processing will be described specifically with reference to FIGS. 2A-4.

Figure 2A:
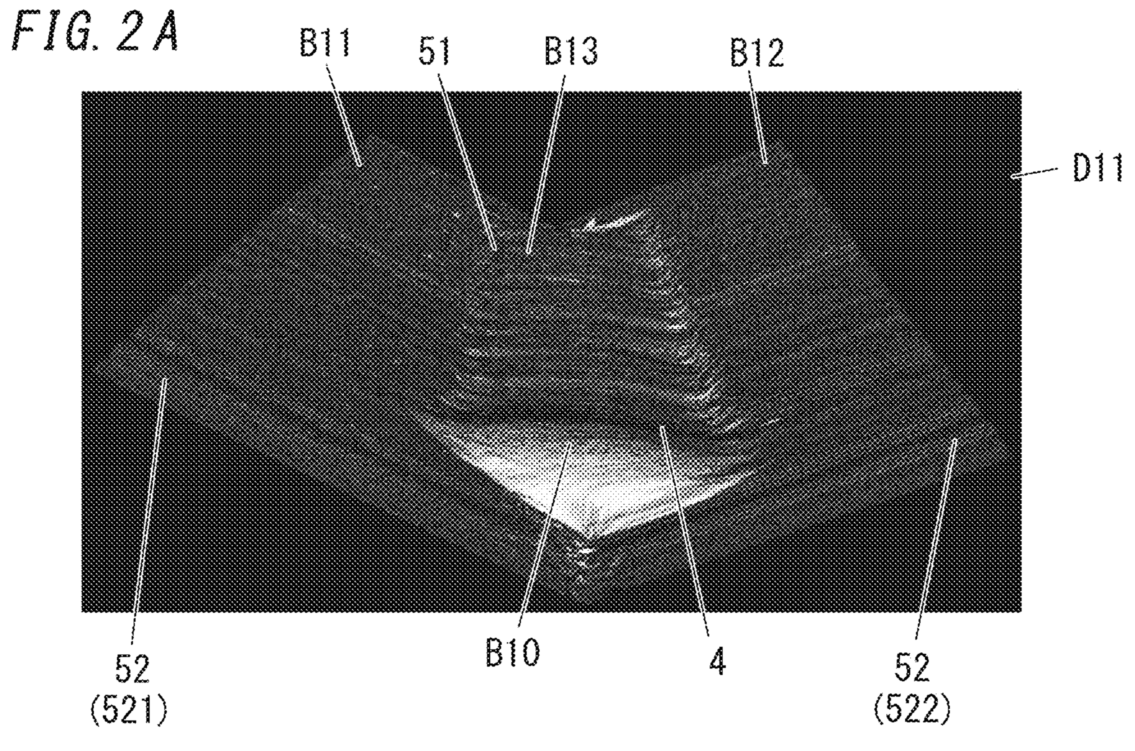
FIG. 2A shows exemplary first image data to be input to the data creation system.
Figure 2B:
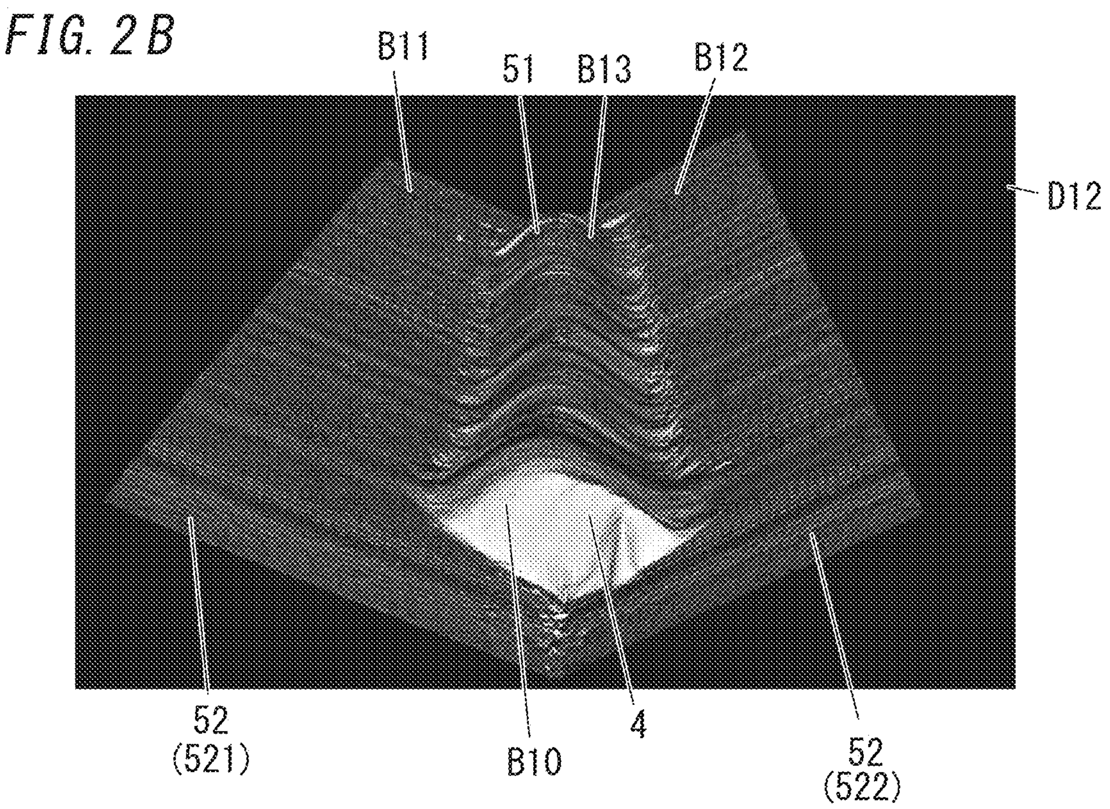
FIG. 2B shows second image data created, based on the first image data shown in FIG. 2A, by the data creation system.

FIG. 2A shows exemplary first image data D11 generated by shooting the object 4 obliquely from above the object 4. FIG. 2B shows exemplary second image data D12 generated by causing deformation about the height to the first image data D11 shown in FIG. 2A. The first base material B11 and the second base material B12 are arranged side by side generally in one direction (i.e., laterally). In FIGS. 2A and 2B, the first base material B11 and the second base material B12 are welded together such that the angle formed between their respective surfaces (i.e., welding angle) is an obtuse angle less than 180 degrees as an example. However, the welding angle is not limited to any particular angle.

FIG. 3A shows another exemplary welding data (first image data D11) different from the first image data D11 shown in FIG. 2A. FIG. 3A shows first image data D11 generated by shooting the object 4 from right over the object 4. FIG. 3B shows exemplary second image data D12 generated by causing deformation about the height to the first image data D11 shown in FIG. 3A.

Next, the deformation processing will be described with reference to mainly FIGS. 3A and 3B. In FIGS. 3A and 3B, the first base material B11 and the second base material B12 are arranged side by side along the X-axis (i.e., laterally) and the bead B10 has been formed to be elongate along the Y-axis (i.e., vertically).

The first region 51 is a pixel region representing the object 4 that is the bead B10. That is to say, the first region 51 is a pixel region concerning a welding region formed by welding together the first base material B11 and the second base material B12 to be welded.

The second region 52 is a pixel region representing the base material. In this example, the second region 52 is a pixel region where the object 4 that is the bead B10 is absent. Each of the first base material region 521 and the second base material region 522 that form the second regions 52 is adjacent to the first region 51. In the example shown in FIG. 4, the first base material region 521, the first region 51, and the second base material region 522 are arranged side by side in this order on the positive side of the X-axis.

FIG. 4 is a drawing provided to make the concept of the "deformation about the height of the first region 51" easily understandable. FIG. 4 shows, as a solid curve, only the outline of the bead B10 in a cross section of the bead B10 as taken provisionally along the plane A-A shown in FIG. 3B, as described above. In FIG. 4, the outline of the bead B10 deformed is indicated by the bold curve (as the second curve G2) and the outline of the bead B10 that has not been deformed yet is indicated by the fine curve (as the first curve G1) for the purpose of comparison.

In FIG. 4, the axis of abscissas indicates a direction aligned with the reference plane H1 (a direction corresponding to the width of the bead B10) and the axis of ordinates indicates a direction corresponding to the height of the bead B10 with respect to the reference plane H1. In other words, the axis of abscissas shown in FIG. 4 corresponds to the X-axis shown in FIGS. 3A and 3B and the axis of ordinates shown in FIG. 4 corresponds to the Z-axis shown in FIGS. 3A and 3B. The reference plane H1 is a virtual plane parallel to the X-Y plane in FIGS. 3A and 3B. That is to say, the height of the first region 51 (i.e., the height of the object 4) is a component in a direction perpendicular to the X-Y plane and is the height as measured from the reference plane H1. The reference plane H1 does not have to be a virtual plane but may also be, for example, an installation surface (e.g., the surface of an examination table) on which the object 4 is installed at the time of shooting or the surface of the first base material B11 or the second base material B12. The reference plane H1 may also be a virtual plane set at a position spaced by a predetermined distance from the image capture device 6. The reference plane H1 may be a fixed plane which is set in advance in the memory of the processor 10, for example, or a plane which may be changed in accordance with the user's command entered via the operating member 17.

The first image data D11 and the second image data D12 may be, for example, distance image data. Thus, it can be said that a pixel value representing the height of the first region 51 is a pixel value corresponding to the distance from the target of shooting to the distance image sensor. In the deformation processing, the pixel value corresponding to the "height" shown in FIG. 4 is transformed on the X-Y plane shown in FIG. 3A. Next, the "deformation processing" will be described more specifically.

First, the determiner 13 extracts, from the first image data D11 shown in FIG. 3A, information about the first region 51 (welding region), the first base material region 521, and the second base material region 522 (hereinafter referred to as "region information"). For example, the user may check, with the naked eye, the first image data D11 displayed on the screen by the display device 16 to determine the respective locations and other parameters of the bead B10, the first base material B11, and the second base material B12. Then, the user enters, using the operating member 17, information specifying the respective locations and other parameters of the bead B10, the first base material B11, and the second base material B12.

The determiner 13 extracts, in accordance with the information entered by the user, the region information from the first image data D11 and stores the region information in, for example, the memory of the processor 10. The determiner 13 may have the function of storing information to specify the bead in, for example, the memory of the processor 10 and automatically extracting the region information from the first image data D11 by reference to the information and by performing image processing such as edge detection processing.

Next, the determiner 13 sets reference points P1 in accordance with the region information. A plurality of reference points P1 are arranged side by side in a direction (e.g., a direction parallel to the second direction A2 in this example; refer to FIG. 3B) intersecting with the arrangement direction (i.e., the first direction A1; refer to FIG. 3B) of the first region 51 and the second region 52. In this embodiment, the determiner 13 sets a plurality of reference points P1 which are arranged side by side in the second direction A2. In FIGS. 3A and 3B, the first direction A1 is a direction aligned with the X-axis and the second direction A2 is a direction aligned with the Y-axis. The second direction A2 is a direction in which the bead B10 is welded. For example, the determiner 13 sets a plurality of reference points P1 (only one of which is shown in FIG. 3B) which are arranged side by side on a reference line V1 (refer to FIG. 3A) parallel to the second direction A2 (i.e., the welding direction) and determines the variation on a reference point P1 basis. The determiner 13 may set the reference points P1 on the basis of each of the pixels that are arranged side by side on the reference line V1. In FIG. 3B, the reference line V1 is a single line (virtual line) drawn parallel to the second direction A2 (i.e., the Y-axis) to extend between both longitudinal ends of the bead B10. However, the reference line V1 does not have to be a straight line in a strict sense.

In this embodiment, the reference point P1 is set at the middle of the first region 51 in the arrangement direction (i.e., the first direction A1) of the first region 51 and the second region 52 as shown in FIGS. 3A-4. The determiner 13 sets the reference point P1 at the middle of the first region 51 in the arrangement direction (i.e., the first direction A1) of the first region 51 and the second region 52. In other words, the reference line V1 on which the plurality of reference points P1 are arranged side by side is set at the middle of the width of the bead B10. However, the respective reference points P1 do not have to be set at the middle as long as the reference points P1 fall within the first region 51. That is to say, the location of each of the reference points P1 may be changed arbitrarily in accordance with the user's command entered via the operating member 17, for example, as long as the reference points P1 fall within the first region 51.

The determiner 13 determines the variation with respect to each of the plurality of reference points P1. The following description will be focused on a single reference point P1 out of the plurality of reference points P1 which are set on the reference line V1 for the sake of convenience of description. In FIGS. 3A-4, only the single reference point P1 of interest is shown.

In addition, the determiner 13 also sets the boundaries C1 in accordance with the region information. In this embodiment, the determiner 13 sets the boundaries C1 at the border between the bead B10 (object) and the first base material B11 and at the border between the bead B10 and the second base material B12. In other words, the determiner 13 sets the boundaries C1 at the respective borders between the outline of the bead B10 and the respective base materials.

Specifically, the boundaries C1 include a first boundary (line) C11 and a second boundary (line) C12. The first boundary C11 is set at the border between the bead B10 and the first base material B11. The second boundary C12 is set at the border between the bead B10 and the second base material B12.

The first boundary C11 includes a first boundary point C110. The second boundary C12 includes a second boundary point C120. The first boundary point C110 is located at the intersection between the first boundary C11 and the line A-A passing through the reference point P1 of interest (and parallel to the X-axis). The second boundary point C120 is located at the intersection between the second boundary C12 and the line A-A. In this example, the reference plane H1 is set as a plane parallel to the X-Y plane and passing through the first boundary point C110 and the second boundary point C120 (refer to FIG. 4).

The determiner 13 determines the variation based on the reference point P1, the first boundary point C110, and the second boundary point C120 thus set. As used herein, the "variation" refers to the variation in the height (i.e., height variation) of the first region 51 (welding region) (before the deformation) in the first image data D11 (see the first curve G1 shown in FIG. 4).

For example, the determiner 13 determines the variation to allow the height at the reference point P1 with respect to the reference plane H1 to go beyond a maximum point P2, of which the height with respect to the reference plane H1 is maximum within the first region 51 before the deformation. In other words, the deformation about the height of the first region 51 is caused to allow the height at the reference point P1 with respect to the reference plane H1 to go beyond the maximum point P2, of which the height with respect to the reference plane H1 is maximum within the first region 51 before the deformation. In the example shown in FIG. 4, the object 4 is the bead B10, and therefore, its cross section has the shape of mountain, which is convex with respect to the reference plane H1 and which has the maximum point P2 (as its peak). In the example shown in FIG. 4, the maximum point P2 is located at a midpoint between the middle of the bead B10 in the first direction A1 and the second boundary point C120. That is to say, the bead B10 that has not been deformed yet (as indicated by the first curve G1) has the shape of a mountain, of which the peak is shifted toward the positive side of the X-axis with respect to the reference point P1.

In this embodiment, the variation may be, for example, a quantity that changes the height of the bead B10 that has not been deformed yet (as indicated by the first curve G1) in an increasing direction. The determiner 13 determines, as for the range located on the negative side of the X-axis with respect to the reference point P1, the magnitude of increase (i.e., the variation) from the first curve G1 such that the closer to the reference point P1 a point of interest is, the greater the magnitude of increase is and the closer to the first boundary point C110 the point of interest is, the smaller the magnitude of increase is. In the same way, the determiner 13 determines, as for the range located on the positive side of the X-axis with respect to the reference point P1, the magnitude of increase (i.e., the variation) from the first curve G1 such that the closer to the reference point P1 a point of interest is, the greater the magnitude of increase is and the closer to the second boundary point C120 the point of interest is, the smaller the magnitude of increase is. The determiner 13 determines the magnitude of increase (i.e., variation) from the first curve G1 to plot a second curve G2 having such a mountain shape as to make the reference point P1 a new peak when the first region 51 is viewed as a whole. As can be seen from FIG. 4, the magnitude of increase from the first curve G1 on the negative side of the X-axis with respect to the reference point P1 is different from the magnitude of increase from the first curve G1 on the positive side of the X-axis with respect to the reference point P1. This difference in the magnitude of increase may be set, for example, depending on the outline shape (see the first curve G1 shown in FIG. 4) of a cross section of the bead B10 that has not been deformed yet. The determiner 13 may use, for example, a beta distribution to calculate the height variation (i.e., to determine the magnitude of increase from the first curve G1).

In this manner, the determiner 13 determines as many magnitudes of increase in the height of one curve passing through the first boundary point C110, the reference point P1, and the second boundary point C120 along the X-axis with respect to the height of the bead B10 that has not been deformed yet (indicated by the first curve G1) as the plurality of reference points P1.

Optionally, the reference point P1 may also be a point (directly) specified appropriately by the user. In that case, the acquirer 11 of the processor 10 is preferably configured to acquire specification information to specify the location of the reference point P1 in the first region 51. The specification information may be entered by the user via the operating member 17, for example. The acquirer 11 may acquire, for example, specification information specifying the ratio to be defined by the location of the reference point P1 with respect to both ends along the width of the first region 51. Specifically, if the ratio is "0:1," then the reference point P1 is set at one end of the first region 51 on the negative side of the X-axis (i.e., at the left end in FIG. 3B). If the ratio is "0.5:0.5," then the reference point P1 is set at the middle of the first region 51. If the ratio is "1:0," then the reference point P1 is set at the other end of the first region 51 on the positive side of the X-axis (i.e., at the right end in FIG. 3B). Then, the processor 10 sets the reference point P1 in accordance with the specification information.

The specification information may include information about the pixel location (i.e., X-Y coordinates) of the reference point P1. The specification information may be entered by the user by using, for example, a mouse as the operating member 17. For example, the user may specify the pixel location (i.e., X-Y coordinates) of the reference point P1 by using a mouse as the operating member 17 while checking, with the naked eye, the first image data D11 displayed on the screen by the display device 16. Optionally, the first boundary point C110 and the second boundary point C120, having the same Y coordinate as the reference point P1 of interest, may also be specified by the user using a mouse as the operating member 17. The determiner 13 calculates, based on the reference point P1, the first boundary point C110, and the second boundary point C120 that have been entered, the height variation such that the closer to the reference point P1 a point of interest is, the greater the height variation is and the closer to the first boundary point C110 or the second boundary point C120 the point of interest is, the smaller the height variation is. Then, the determiner 13 makes the display device 16 display, on the screen, an image in which the height variation thus calculated is introduced to the first image data D11. The user checks, with the naked eye, the image displayed by the display device 16 and, when there is no problem, selects an enter button, displayed on the screen by the display device 16, by using the mouse to determine the height variation with respect to this reference point P1. The height variation may also be determined in the same way as for the other reference points P1 (i.e., reference points P1 having different Y coordinates). As can be seen, the data creation system 1 may include a specifier 18 (including the operating member 17 and the acquirer 11 in combination) for specifying, in accordance with the operating command entered by the user, the reference point P1 within the first region 51. Optionally, the determiner 13 may calculate a plurality of height variations (as the magnitudes of increase from the first curve G1) and the user may determine, while checking a plurality of images generated respectively by applying the plurality of height variations thus calculated to the first image data D11, which of the plurality of images (i.e., which of the plurality of height variations) should be selected.

The deformer 12 generates, based on the decision made by the determiner 13 (about the magnitude of increase), the second image data D12 by causing deformation about the height of the first region 51 with respect to the reference plane H1 to the first image data D11. That is to say, the deformer 12 changes, with respect to a plurality of pixels that forms one line passing through each of the plurality of reference points P1, the pixel values thereof before the deformation into pixel values corresponding to a height to which the magnitude of increase (i.e., the height variation) determined by the determiner 13 has been added. In this manner, the deformer 12 generates, based on the first image data D11, the second image data D12 by causing deformation about the height of the first region 51 with respect to the reference plane H1 to the first image data D11. The outline shape of a cross section of the bead B10 that has been deformed (see the second curve G2 shown in FIG. 4) has a different peak position and a different height from, but maintains a certain degree of correlation with respect to, the outline shape of a cross section of the bead B10 that has not been deformed yet (see the first curve G1 shown in FIG. 4).

The deformer 12 may create the second image data D12 by further causing another type of deformation (such as scaling up or down, rotation, or flipping by affine transformation or projective transformation) as well as the deformation about the height of the object 4.

Figure 5:
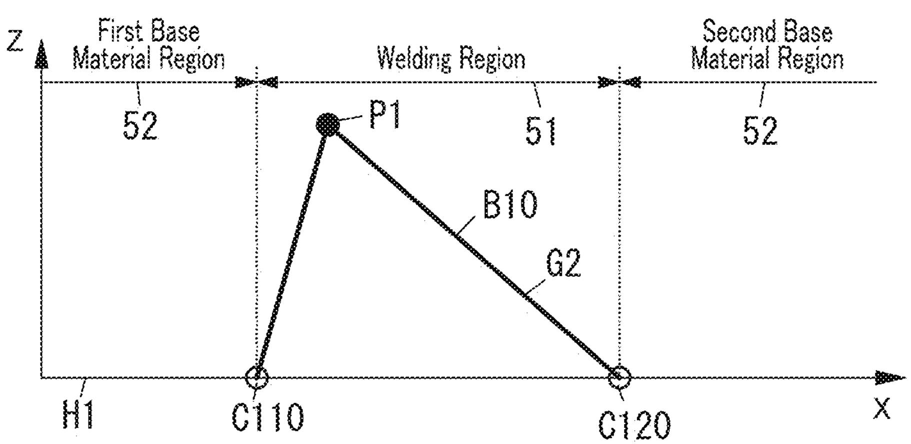
FIG. 5 shows how the data creation system performs the deformation processing in a situation where a tilt angle at a reference point is not 0 degrees.

The bead B10 that has been deformed may have a shape with a pointed peak (representing the reference point P1) as shown in FIG. 5. Actually, however, the bead B10 formed by the welding process step is unlikely to have a mountain shape with such a pointed peak. That is to say, depending on the type of the object 4, the second image data D12 including the first region 51 having a pointed peak shape may be data representing an unreal shape. Thus, according to this embodiment, the determiner 13 determines the variation to allow a tilt angle (defined by the outline of the bead B10 that has been deformed) at the reference point P1 with respect to the reference plane H1 to fall within a predetermined angular range including 0 degrees. In other words, the deformation about the height of the first region 51 is caused to allow the tilt angle at the reference point P1 with respect to the reference plane H1 to fall within the predetermined angular range including 0 degrees. The predetermined angular range may be supposed to be a range from −10 degrees to +10 degrees, for example. However, this range is only an example and may be changed as appropriate. For example, the determiner 13 may determine the variation that plots a smooth curve such that a differential value (of the height of the first region 51) at the reference point P1 becomes equal to zero. As used herein, the differential value refers to the ratio (i.e., gradient), calculated at the reference point P1, of the magnitude of displacement in the height direction (toward the positive side of the Z-axis) to the magnitude of displacement toward the positive side of the X-axis along the reference plane H1. Determining the variation to allow the tilt angle to fall within a predetermined angular range including 0 degrees in this manner reduces the chances of the second curve G2 having a pointed shape at the reference point P1, thus substantially preventing the image data created from representing an unreal shape.

Figure 6:
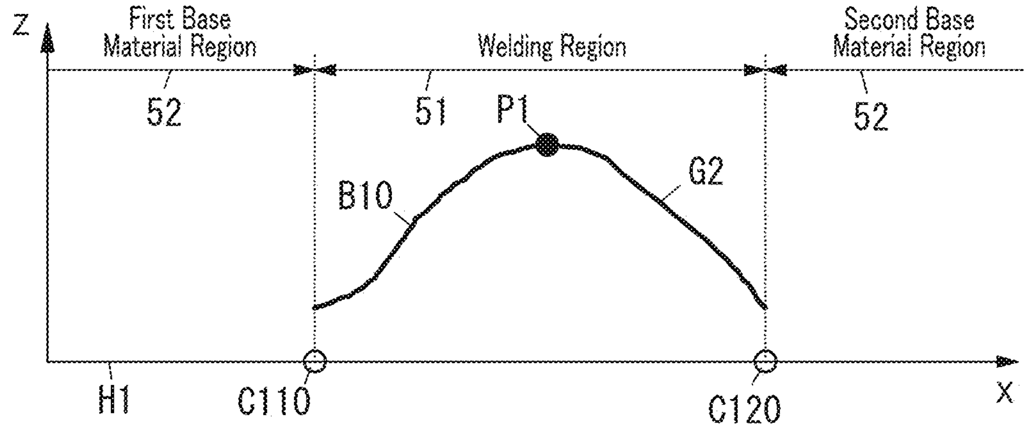
FIG. 6 shows how the data creation system performs the deformation processing in a situation where a variation at a boundary is not zero.

Furthermore, the outline of a cross section of the bead B10 that has been deformed (as indicated by the second curve G2) may rise as a whole to detach itself from the reference plane H1 in the vicinity of the boundaries C1 (i.e., around the first boundary point C110 and the second boundary point C120) as shown in FIG. 6. That is to say, chances are that the first region 51 (representing a welding region) and the second regions 52 (base material regions) come to have significantly different heights at the boundaries C1, thus possibly generating discontinuous second image data D12. The second image data D12 including such a discontinuous region may be data representing an unreal object. Thus, according to this embodiment, the determiner 13 determines the variation to allow the variation at the boundaries C1 to fall within a prescribed range including zero. In other words, the deformation about the height of the first region 51 is caused to allow the variation at the boundaries C1 to fall within the prescribed range including zero. The prescribed range is supposed to be a range from −3% to +3% of the height of the reference point P1 with respect to the reference plane H1, for example. However, this range is only an example and may be changed as appropriate. Determining the variation to allow the variation at the boundaries C1 to fall within a prescribed range including zero in this manner reduces the chances of causing the difference in height at the boundaries C1, thus substantially preventing the image data generated from representing an unreal shape.

Figure 7:
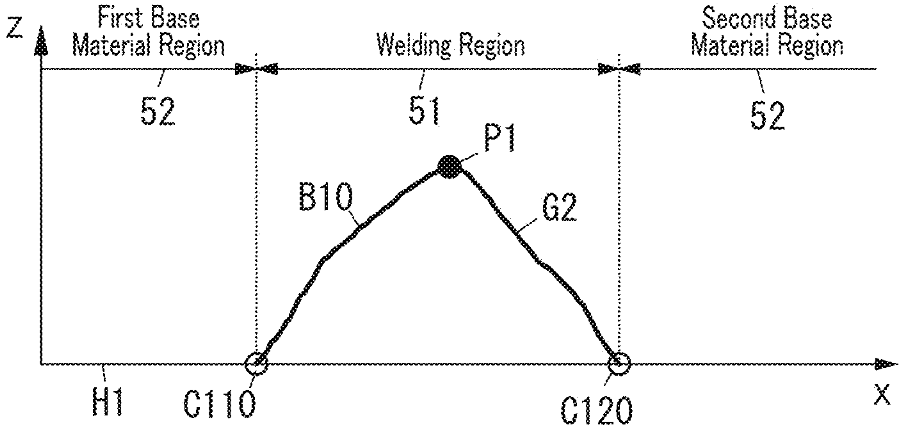
FIG. 7 shows how the data creation system performs the deformation processing in a situation where a tilt angle at the boundary is not 0 degrees.

Furthermore, the outline of a cross section of the bead B10 that has been deformed (as indicated by the second curve G2) may steeply increase its height with respect to the reference plane H1 from around the boundaries C1 (namely, from around the first boundary point C110 and the second boundary point C120) as shown in FIG. 7. That is to say, second image data D12 representing recessed edges at the boundaries C1 between the first region 51 (welding region) and the second regions 52 (base material regions) may be generated. The second image data D12 having such recessed regions may be data representing an unreal object. Thus, according to this embodiment, the determiner 13 determines the variation to allow a tilt angle (defined by the outline of the bead B10 that has been deformed) at the boundaries C1 with respect to the reference plane H1 to fall within a predetermined angular range including 0 degrees. In other words, the deformation about the height of the first region 51 is caused to allow the tilt angle at the boundaries C1 with respect to the reference plane H1 to fall within the predetermined angular range including 0 degrees. The predetermined angular range is supposed to be a range from −10 degrees to +10 degrees, for example. However, this range is only an example and may be changed as appropriate. Determining the variation to allow the tilt angle at the boundaries C1 to fall within a predetermined angular range including 0 degrees in this manner reduces the chances of causing such recessed edges at the boundaries C1, thus substantially preventing the image data generated from representing an unreal shape.

Figure 8A:
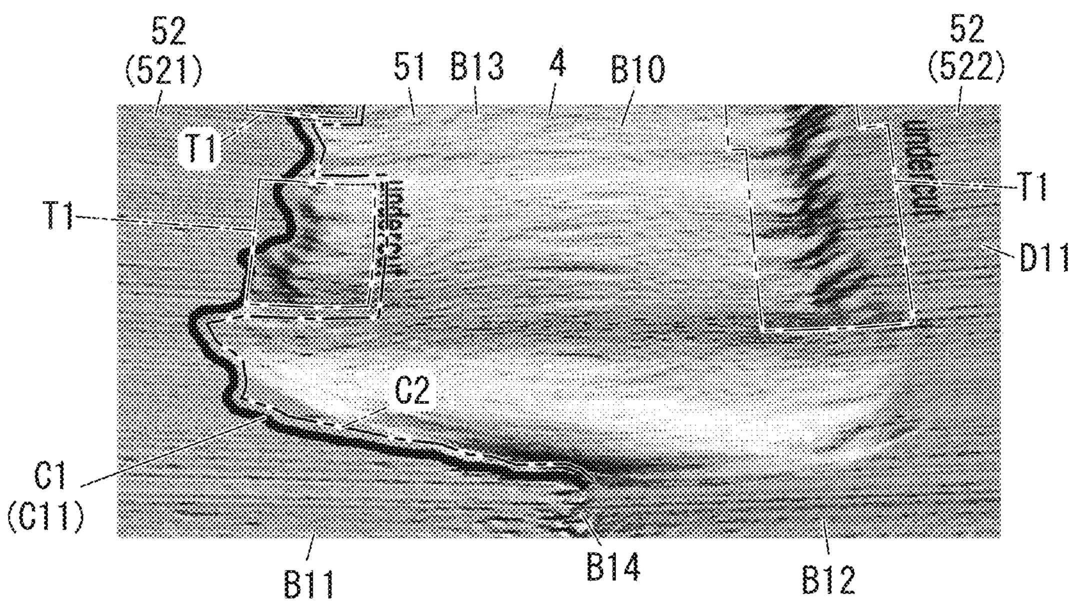
FIGS. 8A and 8B illustrate how the data creation system resets the boundary.
Figure 8B:
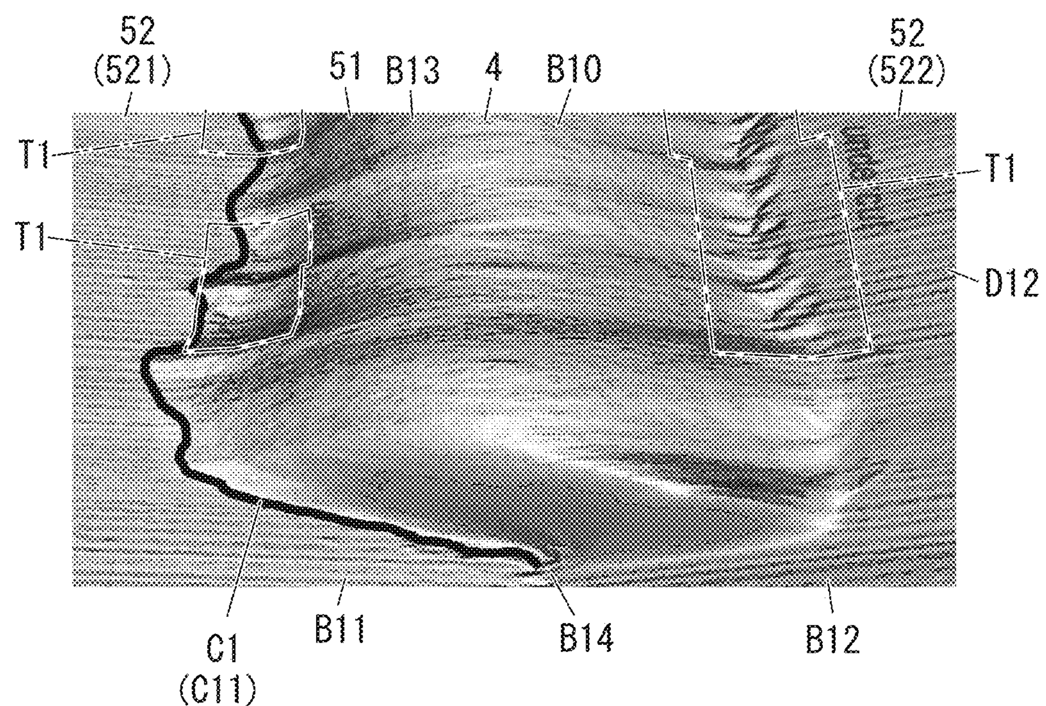

In some cases, an undercut may be present as a type of defect (i.e., a defect caused as a recess which may be formed on the surface of the base material between the welding region and the base material region) in the vicinity of a boundary C1 in the first image data D11. FIG. 8A is an enlarged view of a main part of the first image data D11 generated by shooting the object 4 (i.e., the bead B10 in this example) from obliquely above the object 4. In FIG. 8A, particular regions T1 each having an undercut (in a particular form) are indicated by one-dot-chain frames. In this case, if an undercut is present on the first region 51 with respect to the boundaries C1 as shown in FIG. 8A, then causing deformation about the height of the first region 51 would also cause an increase in the height of the undercut as well, thus possibly making the undercut a gentler recess. The second image data D12 (refer to FIG. 8B) including the particular region T1 with such an undercut having the increased height may being data representing an unreal object. Thus, according to this embodiment, if there is any particular region T1 with such a particular form on the first region 51 with respect to the boundaries C1, then the deformer 12 generates the second image data D12 by causing deformation to the first region 51 except the particular region T1. In other words, if there is any particular region T1 with such a particular form on the first region 51 with respect to the boundaries C1, then deformation about the height of the first region 51 is caused to the first region 51 except the particular region T1. For example, the deformer 12 may set an auxiliary boundary C2 (as indicated by the one-dot chain in FIG. 8A) separately from the boundaries C1 to make the particular region T1 included in the second region 52 (i.e., to make the particular region T1 off the target of the deformation processing). Consequently, this reduces the chances of the height of the particular region T1 being changed as a result of the deformation. That is to say, this enables generating the second image data D12 by causing deformation about the height of the bead B10 while maintaining the undercut part in the state of the first image data D11.

The particular region T1 may be set by, for example, accepting the operating command entered by the user via the operating member 17.

In the example described above, the particular form in the particular region T1 is an undercut as a type of defect. However, this is only an example and should not be construed as limiting. Alternatively, the particular form may also be any other type of defect such as a pit. Conversely, even if a defective part is present on the first region 51 with respect to the boundaries C1, subjecting the defective part to the deformation processing without setting any auxiliary boundary C2 is also an option, considering the variety of the image data about defects.

(2.3) Operation

Figure 9:
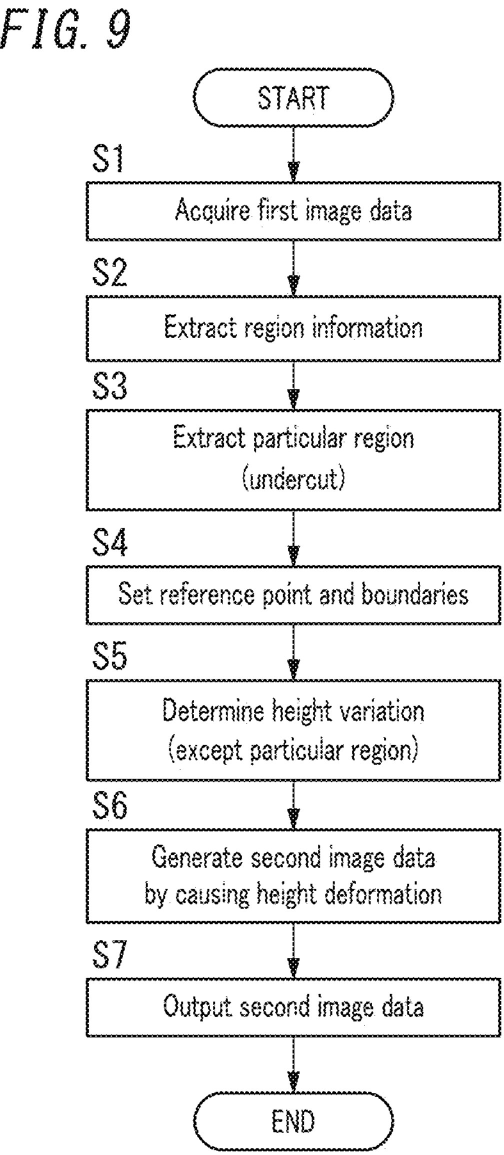
FIG. 9 is a flowchart showing the procedure of operation of the data creation system.

Next, an exemplary operation of the data creation system 1 will be described with reference to FIG. 9. Note that the procedure of operation to be described below is only an example and should not be construed as limiting.

To perform data augmentation processing, the processor 10 of the data creation system 1 acquires first image data D11 as original learning data (in S1). The first image data D11 may be data representing a bead B10 in a "defective (condition)" having an undercut, for example.

The processor 10 extracts, from the first image data D11, region information about the first region 51 (welding region), the first base material region 521, and the second base material region 522 (in S2). In addition, the processor 10 also extracts undercut information about a particular region T1 with the undercut (in S3).

Next, the processor 10 sets, based on the region information and the undercut information, a plurality of reference points P1 and boundaries C1 (auxiliary boundary C2) (in S4). Then, the processor 10 determines the variation about the height of the first region 51 (welding region) except the particular region T1 (in S5).

Subsequently, the processor 10 generates second image data D12 by causing deformation about the height (i.e., changing pixel values) based on the variation thus determined (in S6).

Then, the processor 10 outputs the second image data D12 thus generated (in S7). The same label "defective (undercut)" as the original first image data D11 is attached to the second image data D12, which is then stored as learning data (image data D1) in the storage device.

Advantages

As can be seen from the foregoing description, the data creation system 1 according to this embodiment makes it easier to create second image data D12 having either a mountain shape formed by increasing the height of the first region 51 of the first image data D11 or a valley shape formed by decreasing the height of the first region 51 of the first image data D11. Consequently, this enables increasing the variety of learning data, thus contributing to improving the performance of recognizing the object 4.

In addition, according to this embodiment, a plurality of reference points P1 are set to be arranged side by side in a direction (i.e., the second direction A2) intersecting with an arrangement direction (i.e., the first direction A1) of the first region 51 and the second region 52. This allows forming a first region 51 in a ridge or valley shape defined by the plurality of reference points P1. This makes it even easier to create second image data D12 having either a mountain shape formed by increasing the height of the first region 51 of the first image data D11 or a valley shape formed by decreasing the height of the first region 51 of the first image data D11.

Furthermore, according to this embodiment, the determiner 13 sets the reference point P1 (peak) at the middle of the first region 51. This enables creating, if the peak of the first region 51 is shifted from the middle in the original first image data D11, for example, image data in which the peak position has been displaced. Consequently, this further increases the variety of learning data. As described above, in this embodiment, the reference point P1 is set at the middle of the first region 51 along the width (i.e., along the X-axis) of the bead B10. However, this is only an example and should not be construed as limiting. Alternatively, one reference point P1 out of the plurality of reference points P1 may be set at the middle of the first region 51 along the width of the bead B10 and the other reference points P1 may be set on a line passing through the one reference point P1 (i.e., along the Y-axis). Still alternatively, each of the plurality of reference points P1 may be set one by one at the middle of the first region 51 along the width of the bead B10.

(3) Variations

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. Also, the functions of the data creation system 1 according to the exemplary embodiment described above may also be implemented as a data creation method, a computer program, or a non-transitory storage medium on which the computer program is stored.

Next, variations of the exemplary embodiment will be enumerated one after another. Note that the variations to be described below may be adopted in combination as appropriate. In the following description, the exemplary embodiment described above will be hereinafter sometimes referred to as a "basic example."

The data creation system 1 according to the present disclosure includes a computer system. The computer system may include a processor and a memory as principal hardware components thereof. The functions of the data creation system 1 according to the present disclosure may be performed by making the processor execute a program stored in the memory of the computer system. The program may be stored in advance in the memory of the computer system. Alternatively, the program may also be downloaded through a telecommunications line or be distributed after having been recorded in some non-transitory storage medium such as a memory card, an optical disc, or a hard disk drive, any of which is readable for the computer system. The processor of the computer system may be made up of a single or a plurality of electronic circuits including a semiconductor integrated circuit (IC) or a large-scale integrated circuit (LSI). As used herein, the "integrated circuit" such as an IC or an LSI is called by a different name depending on the degree of integration thereof. Examples of the integrated circuits include a system LSI, a very-large-scale integrated circuit (VLSI), and an ultra-large-scale integrated circuit (ULSI). Optionally, a field-programmable gate array (FPGA) to be programmed after an LSI has been fabricated or a reconfigurable logic device allowing the connections or circuit sections inside of an LSI to be reconfigured may also be adopted as the processor. Those electronic circuits may be either integrated together on a single chip or distributed on multiple chips, whichever is appropriate. Those multiple chips may be aggregated together in a single device or distributed in multiple devices without limitation. As used herein, the "computer system" includes a microcontroller including one or more processors and one or more memories. Thus, the microcontroller may also be implemented as a single or a plurality of electronic circuits including a semiconductor integrated circuit or a large-scale integrated circuit.

Also, in the embodiment described above, the plurality of functions of the data creation system 1 are aggregated together in a single housing. However, this is not an essential configuration for the data creation system 1. Alternatively, those constituent elements of the data creation system 1 may be distributed in multiple different housings.

Conversely, the plurality of functions of the data creation system 1 may be aggregated together in a single housing. Still alternatively, at least some functions of the data creation system 1 (e.g., some functions of the data creation system 1) may be implemented as a cloud computing system, for example.

(3.1) First Variation

Next, a first variation of the present disclosure will be described with reference to FIG. 10 and FIGS. 11A-11C. In the following description, any constituent element of the first variation, having substantially the same function as a counterpart of the data creation system 1 according to the basic example described above, will be designated by the same reference numeral as that counterpart's, and description thereof will be omitted herein as appropriate.

In the basic example described above, the first region 51 that is a pixel region representing the object 4 is a target region to which the deformation about the height should be caused. In this variation, the target region to which the deformation about the height should be caused is the second region 52, which is a difference from the basic example. In addition, in this variation, not only the first image data D11 but also reference image data D4 (as sample data; refer to FIGS. 10 and 11B) are used as the input image data, which is another difference from the basic example.

Figure 10:
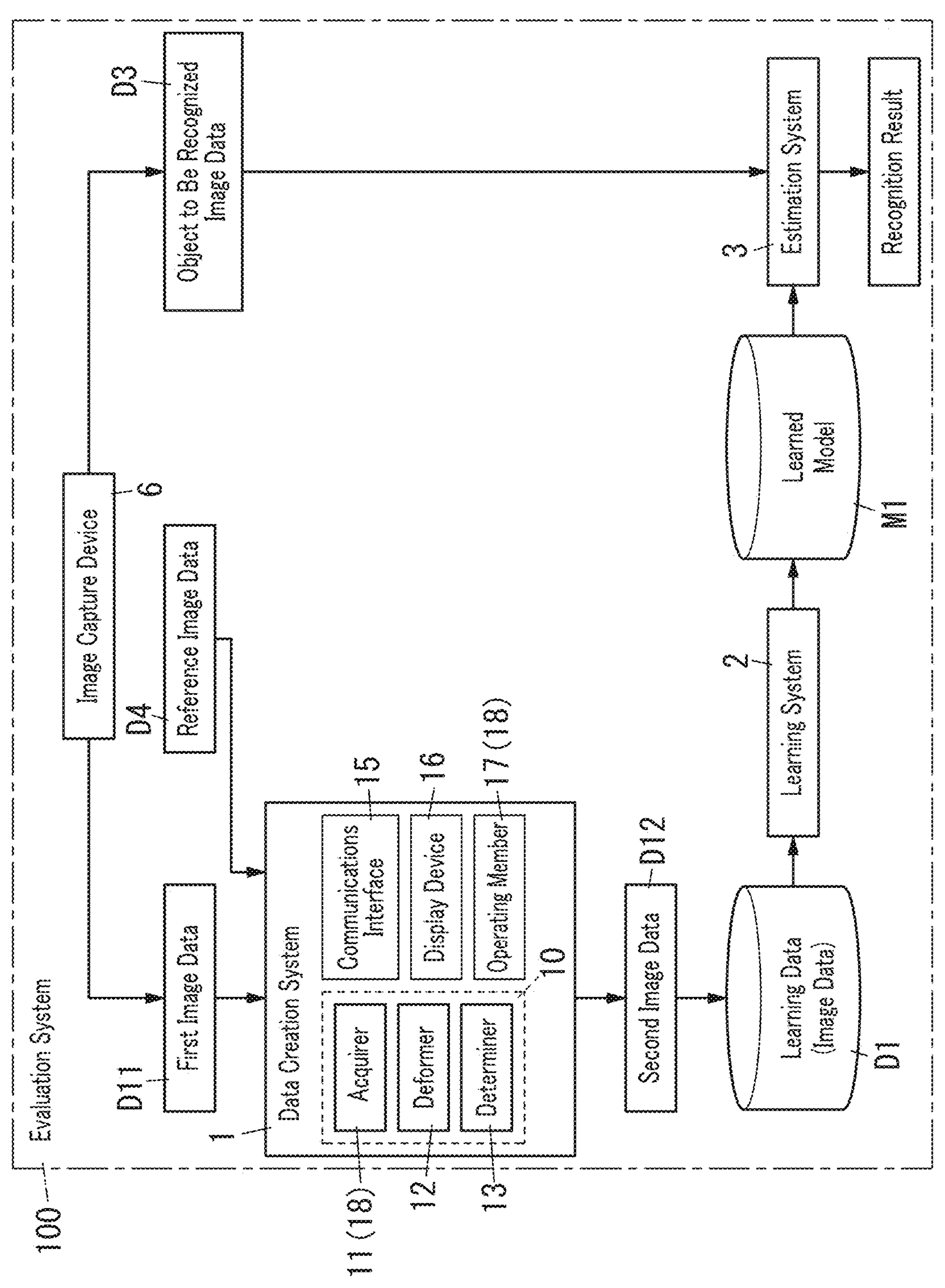
FIG. 10 is a block diagram illustrating a schematic configuration for an overall evaluation system including a first variation of the data creation system.

Specifically, a data creation system 1A according to this variation creates, based on the first image data D11 and reference image data D4, the second image data D12 for use as learning data to generate a learned model M1 about an object 4. As shown in FIG. 10, the data creation system 1A includes a processor 10. The processor 10 includes a deformer 12A and a determiner 13A.

As in the basic example described above, the first image data D11 also includes a first region 51 (welding region) as a pixel region representing the object 4 (bead B10) and second regions 52 (first base material region 521 and second base material region 522) adjacent to the first region 51. In this variation, the second regions 52 are pixel region where the object 4 that is a bead B10 is absent. The first image data D11 is image data actually captured with an image capture device 6, for example.

Figure 11:
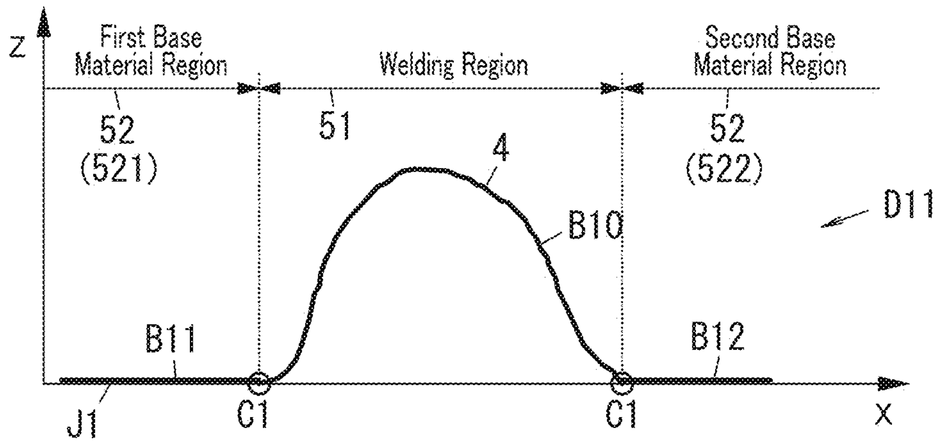
FIGS. 11A-11C show how deformation processing is performed in the first variation.
Figure 11:
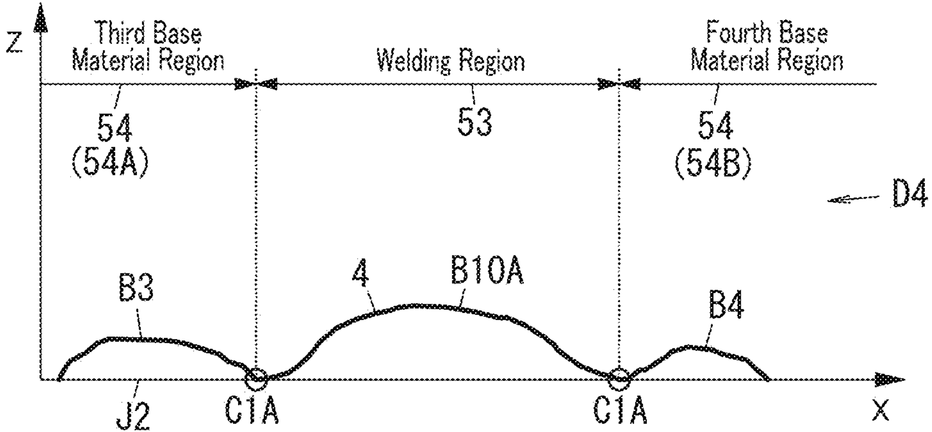
Figure 11:
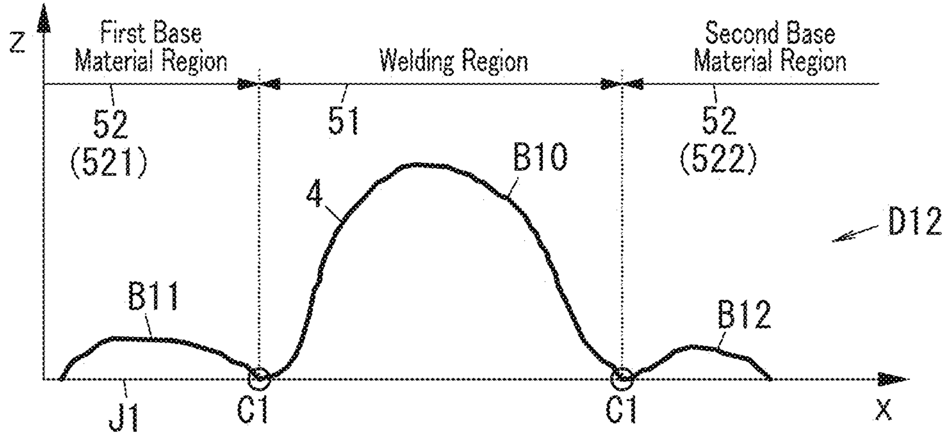

The two base materials (namely, a first base material B11 and a second base material B12) shot in the first image data D11 are each a flat metal plate as in the basic example described above. In the basic example, the first image data D11 is data representing the first base material B11 and the second base material B12 welded together to form an obtuse angle less than 180 degrees between themselves. In this variation, the first base material B11 and the second base material B12 are supposed to be welded together to be substantially flush with each other for the sake of convenience of description. FIG. 11A schematically shows the respective heights of the first region 51 (welding region) and the two second regions 52 (base material regions) on a cross section taken along a plane passing through a reference point P1 in the first region 51 of the first image data D11 and aligned with the X-axis.

The reference image data D4 includes a third region 53 as a pixel region representing the object 4 and fourth regions 54 (namely, a third base material region 54A and a fourth base material region 54B) adjacent to the third region 53 (refer to FIG. 11B). In this variation, the object 4 shot in the reference image data D4 is also a bead B10A. The third region 53 is a pixel region representing the bead B10A. The first region 51 and the third region 53 are both welding regions and both have a welding direction aligned with the Y-axis. There are two fourth regions 54 (namely, the third base material region MA and the fourth base material region MB), each of which is a pixel region representing a base material to be welded. In this variation, the fourth regions 54 are pixel regions where the object 4 that is the bead B10A is absent. The second regions 52 and the fourth regions 54 are both base material regions. Nevertheless, neither of the two base materials shot in the reference image data D4 is a flat metallic plate but both of the two base materials are metallic pipes, which is a difference from the first image data D11. That is to say, the reference image data D4 is image data representing pipe welding. Of the two fourth regions 54, the third base material region 54A corresponds to a region of a third base material B3 in the shape of a pipe and the fourth base material region 54B corresponds to a region of a fourth base material B4 in the shape of a pipe (refer to FIG. 11B). FIG. 11B also schematically shows the respective heights of the third region 53 (welding region) and the two fourth regions 54 (base material regions) on a cross section taken along a plane passing through one reference point in the third region 53 of the reference image data D4 and aligned with the X-axis. The reference image data D4 is image data actually captured with the image capture device 6, for example. Alternatively, the reference image data D4 may also be a CG image in which the object and the base materials are rendered. Still alternatively, the reference image data D4 may also be created by locally padding an actually shot image into a CG image.

In the first image data D11, a reference plane (first reference plane J1) is defined to be a plane which is parallel to an X-Y plane and passes through two boundaries C1 (boundary points) as shown in FIG. 11A. In this variation, the first reference plane J1 is substantially aligned with the respective surfaces of the first and second base materials B11, B12 which are substantially flush with each other. In the first image data D11, the base materials are flat metallic plates. Thus, the respective heights of the first and second base materials B11, B12 with respect to the first reference plane J1 are both zero.

In the reference image data D4, a reference plane (second reference plane J2) is defined to be a plane which is parallel to an X-Y plane and passes through two boundaries CIA (boundary points) as shown in FIG. 11B. In the reference image data D4, the third and fourth base materials B3, B4 are metallic pipes. Thus, the respective heights of the third and fourth base materials B3, B4 with respect to the second reference plane J2 are greater than zero. In FIG. 11B, the heights of respective parts (substantially circular arc shaped parts) of the third and fourth base materials B3, B4 that are metallic pipes are shown schematically.

The processor 10 according to this variation generates the second image data D12 by causing deformation about the height of the second regions 52 with respect to the first reference plane J1 based on the height of the fourth regions 54 with respect to the second reference plane J2 in the reference image data D4. The determiner 13A determines the variation about the height of the second regions 52 based on the height of the fourth regions 54 with respect to the second reference plane J2 in the reference image data D4. In this variation, the determiner 13A determines the height variation about the first base material region 521 such that the height (including a peak position) of the first base material region 521 representing the first base material B11 agrees with the height of the third base material region 54A representing the third base material B3 of the pipe welding. In addition, the determiner 13A also determines the height variation about the second base material region 522 such that the height (including a peak position) of the second base material region 522 representing the second base material B12 agrees with the height of the fourth base material region 54B representing the fourth base material B4 of the pipe welding.

The deformer 12A according to this variation generates the second image data D12 by causing deformation about the height of the second regions 52 with respect to the first reference plane J1 to the first image data D11. The deformer 12A generates the second image data D12 by changing each of the pixel values of the first base material region 521 and the second base material region 522 into a pixel value to which the variation (magnitude of increase) determined by the determiner 13A is added. As a result, in the second image data D12, the height and shape of the bead B10 remain the same as the ones represented by the first image data D11. Meanwhile, the second image data D12 will be image data in which the first and second base materials B11, B12 are replaced with metallic pipes as if the image represented pipe welding (refer to FIG. 11C).

As can be seen, causing deformation about the height of the base materials based on another image data (i.e., the reference image data D4) different from the first image data D11 enables further increasing the variety of the learning data and thereby contributing to improving the performance of recognizing the object 4.

(3.2) Second Variation

Next, a second variation of the present disclosure will be described with reference to FIGS. 12A-12C. This variation is still another example of the first variation described above. In the following description, any constituent element of the second variation, having substantially the same function as a counterpart of the data creation system 1A according to the first variation described above, will be designated by the same reference numeral as that counterpart's, and description thereof will be omitted herein as appropriate.

In the first variation described above, the second image data D12 is generated by causing such deformation as to make the height of the second regions 52 (including a peak position thereof) simply agree with the height of the fourth regions 54 in the reference image data D4.

The data creation system 1A according to this variation generates the second image data D12 by causing deformation about the height of the second regions 52 based on the fourth regions 54 in the reference image data D4 while making the height and peak position of the second regions 52 different from those of the fourth regions 54.

Figure 12A:
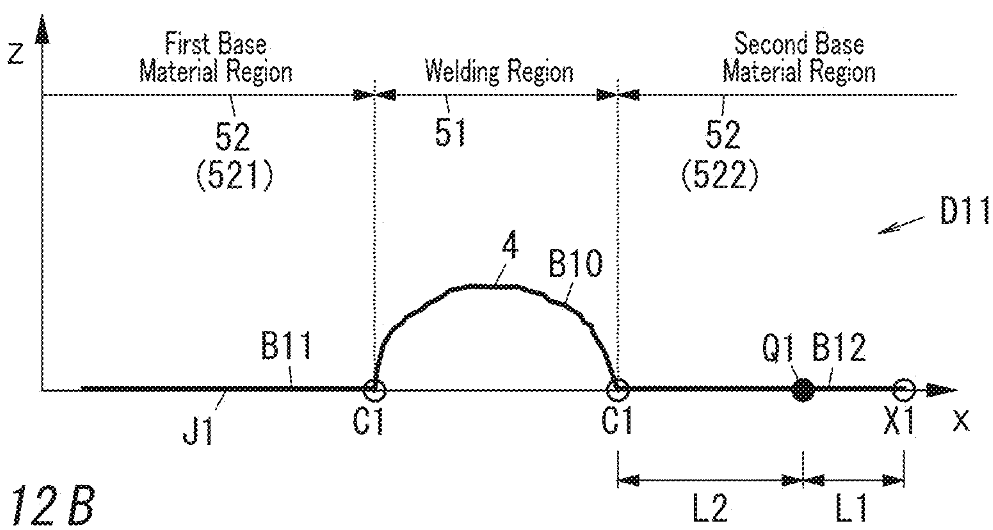
FIGS. 12A-12C show how a second variation of the data creation system performs deformation processing.

Specifically, first, the determiner 13A sets a first reference point Q1 in one of the two second regions 52 (refer to FIG. 12A). The following description will be focused on only the deformation to be caused about the height of the second base material region 522 out of the two second regions 52 for the sake of convenience of description. Although not described in detail in the following description, the deformation to be caused about the height of the first base material region 521 is also supposed to be performed in the same way.

A plurality of first reference points Q1, as well as the reference points P1 of the basic example, are also set in the welding direction (i.e., along the Y-axis). The following description will be focused on a single first reference point Q1 as shown in FIG. 12A. The location of each first reference point Q1 in the X-axis direction is not limited to any particular location as long as the first reference point Q1 falls within the second base material region 522 (second region 52). Rather, the location of each first reference point Q1 in the X-axis direction may be set arbitrarily as specified by the user via the operating member 17, for example.

The determiner 13A defines the distance from an outer edge X1 of the second region 52 to the first reference point Q1 as a first distance L1 and also defines the distance from the boundary C1 between the first region 51 and the second region 52 to the first reference point Q1 as a second distance L2 as shown in FIG. 12A. The outer edge X1 of the second region 52 may be, for example, an outer edge of the second base material region 522 (second region 52) within the first image data D11.

Figure 12B:
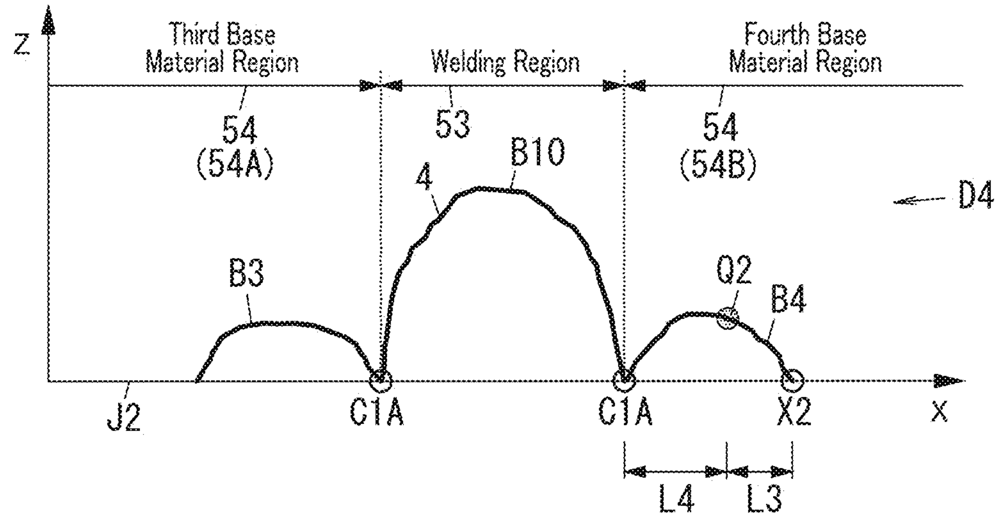
Figure 12C:
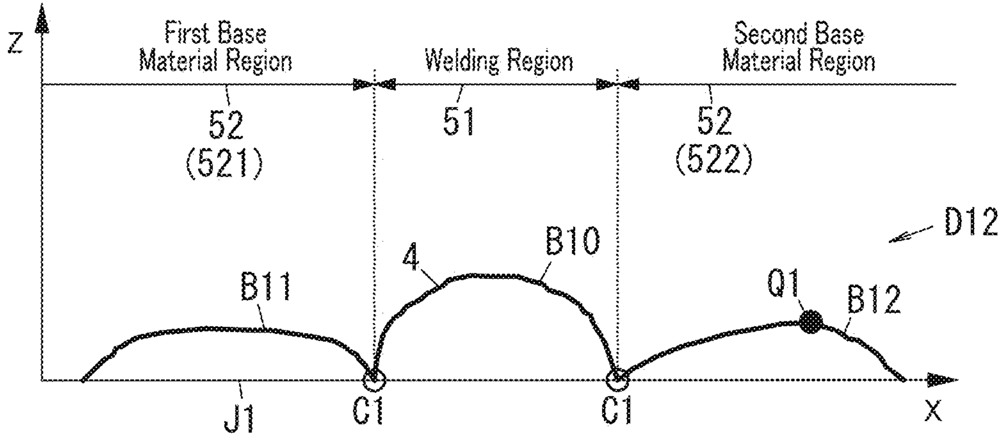

The determiner 13A defines a location where the ratio of the first distance L1 to the second distance L2 is satisfied on the second reference plane J2 in the fourth region 54 of the reference image data D4 as a second reference point Q2 as shown in FIG. 12B. In this case, the distance in the X-axis direction from an outer edge X2 of the fourth base material region 54B (fourth region 54) to the second reference point Q2 is defined as a third distance L3. On the other hand, the distance in the X-axis direction from a boundary CIA between the third region 53 (welding region) and the fourth base material region 54B (fourth region 54) to the second reference point Q2 is defined as a fourth distance L4. In that case, the location of the second reference point Q2 in the X-axis direction is determined such that the ratio of the first distance L1 to the second distance L2 agrees with the ratio of the third distance L3 to the fourth distance L4. That is to say, the second reference point Q2 is not always a peak of the height in the fourth region 54.

The determiner 13A determines the variation at the first reference point Q1 based on the height at the second reference point Q2 with respect to the second reference plane J2. In other words, the variation at the first reference point Q1 is a quantity based on the height at the second reference point Q2 with respect to the second reference plane J2. In this variation, the determiner 13A determines the height variation of the second base material region 522 such that the location of the first reference point Q1 in the X-axis direction becomes a peak position of the second base material region 522 and that the height of the first reference point Q1 in the second base material region 522 agrees with the height of the second reference point Q2. Note that as for the first base material region 521, the determiner 13A also sets the first reference point Q1 and the second reference point Q2 and determines the height variation of the first base material region 521 in the same way as described above.

The deformer 12A generates the second image data D12 by changing the respective pixel values of the first and second base material regions 521, 522 into pixel values to which the variation (i.e., magnitude of increase; height variation) determined by the determiner 13A is added. As a result, in the second image data D12, the height and shape of the bead B10 remain the same as the ones represented by the first image data D11. Meanwhile, the second image data D12 will be image data in which the first and second base materials B11, B12 are replaced with metallic pipes as if the image represented pipe welding (refer to FIG. 12C). The outline shape of a cross section of the second region 52 after the deformation (see the curve shown in FIG. 12C) has a different peak position and a different height from, but maintains a certain degree of correlation with respect to, the outline shape of a cross section of the fourth region 54 in the reference image data D4 (see the curve shown in FIG. 12B).

This variation makes it easier to create the second image data D12 by causing deformation about the height of the second region 52 in the first image data D11 based on the height of the fourth region 54 in the reference image data D4. Consequently, this enables further increasing the variety of learning data, thus contributing to improving the performance of recognizing the object 4.

In this variation, the first reference point Q1 may also be specified appropriately by the user as in the basic example described above. In that case, the acquirer 11 (specifier 18) may acquire specification information to specify the location of the first reference point Q1.

The specification information may be entered by the user using, for example, a mouse (serving as a specifier 18) as the operating member 17. For example, the user may specify the pixel location (i.e., X-Y coordinates) of the first reference point Q1 by using a mouse as the operating member 17 while checking, with the naked eye, the first image data D11 displayed on the screen by the display device 16. Optionally, the boundaries C1 (i.e., boundary points) between the first region 51 and the second regions 52 and the outer edges X1 (i.e., outer edge points) of the second regions 52, both having the same Y coordinate as the first reference point Q1 of interest, in the first image data D11 may also be specified by the user using a mouse as the operating member 17. In addition, optionally, the boundaries CIA (i.e., boundary points) between the third region 53 and the fourth regions 54 and the outer edges X2 (i.e., outer edge points) of the fourth regions 54 in the reference image data D4 may also be specified by the user using a mouse as the operating member 17. The determiner 13A sets the second reference point Q2 in the reference image data D4 based on the ratio of the first distance L1 to the second distance L2, the boundaries CIA (boundary points), and the outer edges X2 (outer edge points) of the fourth regions 54 and calculates the height variation at the first reference point Q1 based on the height at the second reference point Q2 with respect to the second reference plane J2. Then, the determiner 13A makes the display device 16 display, on the screen, an image in which the height variation thus calculated is added to the first image data D11. For example, the determiner 13A may calculate the height variation to make the height of the first reference point Q1 with respect to the first reference plane J1 equal to the height at the second reference point Q2 with respect to the second reference plane J2. The user checks, with the naked eye, the image displayed by the display device 16 and, when there is no problem, selects an enter button, displayed on the screen by the display device 16, by using the mouse to determine the height variation with respect to this reference point Q1. The height variation may also be determined in the same way as for another first reference point Q1 (i.e., a first reference point Q1 having a different Y coordinate). As can be seen, the data creation system 1A may include a specifier 18 (including the operating member 17 and the acquirer 11) for specifying, in accordance with the operating command entered by the user, the first reference point Q1 within the first image data D11.

The functions of the data creation system 1A according to this variation may also be implemented as a data creation method, a computer program, or a non-transitory storage medium on which the computer program is stored. Specifically, a data creation method according to this variation is a method for creating, based on first image data D11 and reference image data D4, second image data D12 for use as learning data to generate a learned model M1 about an object 4. The data creation method includes a processing step. The processing step includes generating, based on the first image data D11 including a first region 51 as a pixel region representing the object 4 and a second region 52 adjacent to the first region 51, the second image data D12 by causing deformation about height of the second region 52 with respect to a first reference plane J1. The processing step includes generating the second image data D12 by causing deformation about height of the second region 52 with respect to the first reference plane J1 based on height of a fourth region 54 of the reference image data D4 with respect to a second reference plane J2. The reference image data D4 includes a third region 53 as a pixel region representing the object 4 and the fourth region 54 adjacent to the third region 53. When a distance from an outer edge X1 of the second region 52 to a first reference point Q1 in the second region 52 is a first distance L1, a distance from a boundary C1 between the first region 51 and the second region 52 to the first reference point Q1 is a second distance L2, and a location where a ratio of the first distance L1 to the second distance L2 on the second reference plane J2 is satisfied in the fourth region 54 of the reference image data D4 is a second reference point Q2, a variation at the first reference point Q1 is a quantity based on height at the second reference point Q2 with respect to the second reference plane J2.

(3.3) Third Variation

In the data creation system 1, the processing device (hereinafter referred to as a "first processing device") 110 including the determiner 13 and the processing device (hereinafter referred to as a "second processing device") 120 including the deformer 12 may be two different devices.

Figure 13:
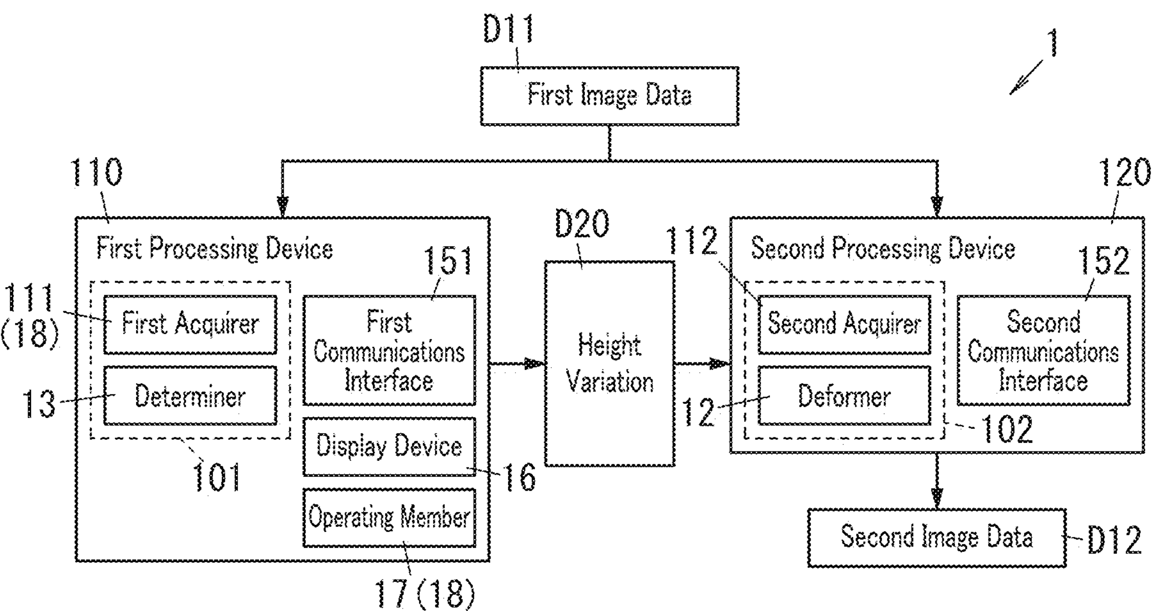
FIG. 13 is a block diagram illustrating a schematic configuration for a third variation of the data creation system.

For example, as shown in FIG. 13, the first processing device 110 includes a processor (hereinafter referred to as a "first processor") 101, a communications interface (hereinafter referred to as a "first communications interface") 151, the display device 16, and the operating member 17. The first processor 101 of the first processing device 110 includes an acquirer (hereinafter referred to as a "first acquirer") 111 and the determiner 13. The first processing device 110 includes a specifier 18 (including the operating member 17 and the first acquirer 111).

The first acquirer 111 acquires the first image data D11. In addition, the first acquirer 111 (specifier 18) may also acquire specification information (i.e., information specifying the location of the reference point P1 in the first region 51).

The determiner 13 determines the variation about the height of the first region 51 (i.e., height variation) with respect to the first image data D11. The determiner 13 determines the height variation such that the closer to the reference point P1 within the first region 51 a point of interest is, the greater the height variation is and the closer to a boundary between the first region 51 and the second region 52 the point of interest is, the smaller the height variation is.

The first communications interface 151 (transmitter) outputs (transmits) the information D20 indicating the height variation determined by the determiner 13 to the second processing device 120.

The second processing device 120 includes a processor (hereinafter referred to as a "second processor") 102 and a communications interface (hereinafter referred to as a "second communications interface") 152. The second processor 102 of the second processing device 120 includes an acquirer (hereinafter referred to as a "second acquirer") 112 and the deformer 12.

The second acquirer 112 acquires the first image data D11.

The second communications interface 152 (receiver) receives the information D20 indicating the height variation. The second acquirer 112 acquires the information D20 indicating the height variation.

The deformer 12 generates, based on the height variation, the second image data D12 by causing deformation about the height of the first region to the first image data D11.

The second processing device 120 may make, for example, the second communications interface 152 transmit the second image data D12 thus generated to the first processing device 110. In that case, the user may make the learning system 2 generate the learned model M1 using the second image data D12 thus received.

The second processing device 120 may transmit the second image data D12 thus generated to an external server including a learning system. The learning system of the external server generates a learned model M1 using a learning data set including learning data as the second image data D12. This learned model M1 outputs, in response to either the second image data D12 (i.e., the second image data D12 generated, based on the height variation, by causing deformation about the height of the first region 51 to the first image data D11) or the first region 51 in the second image data D12, an estimation result similar to a situation where the first image data D11 is subjected to estimation made about the particular condition of the object 4. The user may receive the learned model M1 thus generated from the external server.

(3.4) Fourth Variation

In the data creation system 1A, a processing device (hereinafter referred to as a "first processing device") 110A including the determiner 13A and a processing device (hereinafter referred to as a "second processing device") 120A including the deformer 12A may be two different devices.

Figure 14:
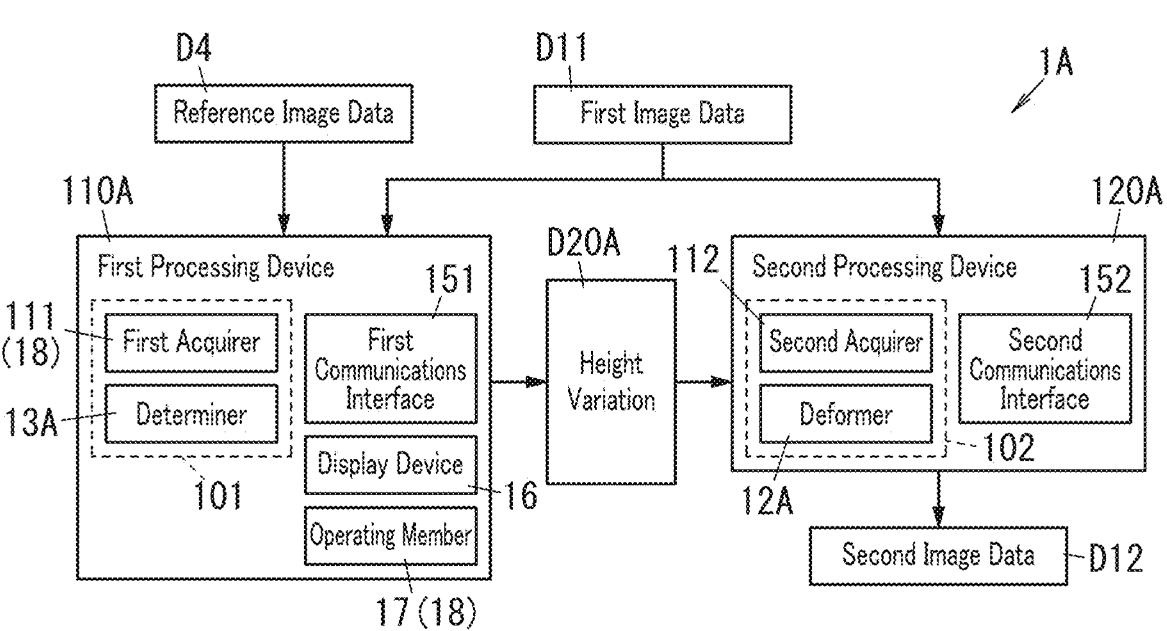
FIG. 14 is a block diagram illustrating a schematic configuration for a fourth variation of the data creation system.

For example, as shown in FIG. 14, the first processing device 110A includes a processor (hereinafter referred to as a "first processor") 101, a communications interface (hereinafter referred to as a "first communications interface") 151, the display device 16, and the operating member 17. The first processor 10 of the first processing device 110 includes an acquirer (hereinafter referred to as a "first acquirer") 111 and a determiner 13A. The first processing device 110A includes a specifier 18 (including the operating member 17 and the first acquirer 111).

The first acquirer 111 acquires the first image data D11 and the reference image data D4. In addition, the first acquirer 111 (specifier 18) may also acquire specification information (i.e., information specifying the location of the first reference point Q1 in the second region 52).

The determiner 13A determines, based on the height of the fourth region 54 of the reference image data D4 with respect to the second reference plane J2, a height variation as a variation in height. More specifically, the determiner 13A determines the height variation to make the variation at the first reference point Q1 a quantity based on the height at the second reference point Q2 with respect to the second reference plane J2. In this case, the second reference point Q2 is a location where the ratio of a first distance L1 to a second distance L2 on the second reference plane J2 is satisfied in the fourth region 54 of the reference image data D4. The first distance L1 is a distance from an outer edge X1 of the second region 52 to the first reference point Q2 in the second region 52. The second distance L2 is a distance from the boundary C1 between the first region 51 and the second region 52 to the first reference point Q1.

The first communications interface 151 (transmitter) outputs (transmits) information D20A indicating the height variation determined by the determiner 13A to the second processing device 120.

The second processing device 120A includes a processor (hereinafter referred to as a "second processor") 102 and a communications interface (hereinafter referred to as a "second communications interface") 152. The second processor 102 of the second processing device 120 includes an acquirer (hereinafter referred to as a "second acquirer") 112 and the deformer 12A.

The second acquirer 112 acquires the first image data D11.

The second communications interface 152 (receiver) receives the information D20A indicating the height variation. The second acquirer 112 acquires the information D20A indicating the height variation.

The deformer 12A generates, based on the height variation, the second image data D12 by causing deformation about the height of the second region 52 with respect to the first reference plane J1 to the first image data D11.

The second processing device 120 may make, for example, the second communications interface 152 transmit the second image data D12 thus generated to the first processing device 110. In that case, the user may make the learning system 2 generate the learned model M1 using the second image data D12 thus received.

The second processing device 120A may transmit the second image data D12 thus generated to an external server including a learning system. The learning system of the external server generates a learned model M1 using a learning data set including learning data as the second image data D12. This learned model M1 outputs, in response to either the second image data D12 (i.e., the second image data D12 generated, based on the height variation, by causing deformation about the second region 52 to the first image data D11) or the first region 51 in the second image data D12, an estimation result similar to a situation where the first image data D11 is subjected to estimation made about the particular condition of the object 4. The user may receive the learned model M1 thus generated from the external server.

(3.5) Other Variations

Next, other variations will be enumerated one after another.

The "image data" as used herein does not have to be image data acquired by an image sensor but may also be two-dimensional data such as a CG image or two-dimensional data formed by arranging multiple items of one-dimensional data acquired by a distance image sensor as already described for the basic example. Alternatively, the "image data" may also be three- or higher dimensional image data. Furthermore, the "pixels" as used herein do not have to be pixels of an image captured actually with an image sensor but may also be respective elements of two-dimensional data.

Also, in the basic example described above, the first image data D11 is image data captured actually with an image capture device 6. However, this is only an example and should not be construed as limiting. Alternatively, the first image data D11 may also include a CG image in which at least part of the bead B10, the first base material B11, and the second base material B12 is rendered schematically.

Furthermore, in the basic example described above, the variation is the magnitude of increase indicating an increase in height with respect to the first region 51 having a mountain shape. However, this is only an example and should not be construed as limiting. Alternatively, the variation may also be the magnitude of decrease. For example, if the object 4 is not raised (as in the bead B10) but recessed (e.g., a scratch left on a metallic plate), then the variation may also be the magnitude of decrease indicating a decrease in height (i.e., an increase in depth, stated otherwise) with respect to the first region 51 having a valley shape.

Furthermore, in the basic example described above, the determiner 13 determines the variation to allow height at the reference point P1 with respect to the reference plane H1 to go beyond a maximum point P2, of which the height with respect to the reference plane H1 is maximum within the first region 51 before the deformation. However, this is only an example and should not be construed as limiting. Alternatively, the determiner 13 may determine the variation to allow height at the reference point P1 with respect to the reference plane H1 to go under the maximum point P2, of which the height with respect to the reference plane H1 is maximum within the first region 51 before the deformation. In other words, the deformation about the height of the first region 51 may be caused to allow the height at the reference point P1 with respect to the reference plane H1 to go under the maximum point P2, of which the height with respect to the reference plane H1 is maximum within the first region 51 before the deformation. This makes it easier to create an even wider variety of second image data D12.

In the basic example described above, the object 4 as an object to be recognized is the welding bead B10. However, the object 4 does not have to be the bead B10. The learned model M1 does not have to be used to conduct a weld appearance test to determine whether welding has been done properly. Alternatively, the first image data D11 may also be image data captured by, for example, an airplane or a drone device up in the air and the object 4 may also be, for example, a mountain or a building (such as an office building). In that case, the first region 51 may be a pixel region representing the mountain and the second region 52 may be a pixel region representing a flatland or a road. A learned model M1 generated by using the second image data D12 may be used to perform identification work about a geographic space.

The data creation system 1 according to the basic example may have not only the function of causing deformation about the height of the first region 51 (welding region) but also the function of causing deformation about the height of the second region 52 (base material region) as described for the first and second variations. The height variation of the base materials according to the first and second variations may be applied to only one of the two base materials. This enables creating image data about welding of two different base materials (such as a metallic plate and a metallic pipe).

Furthermore, in the basic example described above, the reference point P1 in the first region 51 is set at the middle of the first region 51 along the width of the bead B10 (i.e., in the X-axis direction). However, this is only an example and should not be construed as limiting. Alternatively, the reference point P1 may also be set at any location other than the middle.

The evaluation system 100 may include only some of the constituent elements of the data creation system 1. For example, the evaluation system 100 may include only the first processing device 110, out of the first processing device 110 and the second processing device 120 (refer to FIG. 13) of the data creation system 1, and the learning system 2. The functions of the first processing device 110 and the functions of the learning system 2 may be provided for a single device. Alternatively, the evaluation system 100 may include, for example, only the first processing device 110, out of the first processing device 110 and the second processing device 120 of the data creation system 1, and the estimation system 3. The functions of the first processing device 110 and the functions of the estimation system 3 may be provided for a single device.

The evaluation system 100 may include only some of the constituent elements of the data creation system 1A. For example, the evaluation system 100 may include only the first processing device 110A, out of the first processing device 110A and the second processing device 120A (refer to FIG. 14) of the data creation system 1A, and the learning system 2. Alternatively, the evaluation system 100 may include, for example, only the first processing device 110A, out of the first processing device 110A and the second processing device 120A of the data creation system 1A, and the estimation system 3.

(4) Recapitulation

As can be seen from the foregoing description, a data creation system (1) according to a first aspect creates, based on first image data (D11), second image data (D12) for use as learning data to generate a learned model (M1) about an object (4). The data creation system (1) includes a processor (10). The processor (10) generates, based on the first image data (D11) including a first region (51) as a pixel region representing the object (4) and a second region (52), the second image data (D12) by causing deformation about height of the first region (51) with respect to a reference plane (H1). The second region (52) is adjacent to the first region (51). The processor (10) generates the second image data (D12) such that the closer to a reference point (P1) within the first region (51) a point of interest is, the greater a variation in the height of the first region (51) with respect to the reference plane (H1) is and the closer to a boundary (C1) between the first region (51) and the second region (52) the point of interest is, the smaller the variation in the height of the first region (51) with respect to the reference plane (H1) is.

This aspect makes it easier to create second image data (D12) having either a mountain shape formed by increasing the height of the first region (51) of the first image data (D11) or a valley shape formed by decreasing the height of the first region (51) of the first image data (D11). Consequently, this enables increasing the variety of learning data, thus contributing to improving the performance of recognizing the object (4).

In a data creation system (1) according to a second aspect, which may be implemented in conjunction with the first aspect, the deformation about the height of the first region (51) is caused to make a tilt angle at the reference point (P1) with respect to the reference plane (H1) fall within a predetermined angular range including zero degrees.

This aspect may reduce the chances of the reference point (P1) having a sharp shape and the image data created turning into unreal image data.

In a data creation system (1) according to a third aspect, which may be implemented in conjunction with the first or second aspect, the reference point (P1) includes a plurality of reference points (P1) arranged side by side in a direction (second direction A2) intersecting with an arrangement direction (first direction A1) of the first region (51) and the second region (52).

This aspect makes it even easier to create second image data (D12) having either a mountain shape formed by increasing the height of the first region (51) of the first image data (D11) or a valley shape formed by decreasing the height of the first region (51) of the first image data (D11).

In a data creation system (1) according to a fourth aspect, which may be implemented in conjunction with any one of the first to third aspects, the deformation about the height of the first region (51) is caused in the following manner. Specifically, the deformation about the height of the first region (51) is caused to allow height at the reference point (P1) with respect to the reference plane (H1) to go beyond a maximum point (P2), of which height with respect to the reference plane (H1) is maximum within the first region (51) before the deformation.

This aspect makes it easier to create a wider variety of second image data (D12).

In a data creation system (1) according to a fifth aspect, which may be implemented in conjunction with any one of the first to third aspects, the deformation about the height of the first region (51) is caused in the following manner. Specifically, the deformation about the height of the first region (51) is caused to allow height at the reference point (P1) with respect to the reference plane (H1) to come under a maximum point (P2), of which height with respect to the reference plane (H1) is maximum within the first region (51) before the deformation.

This aspect makes it easier to create a wider variety of second image data (D12).

In a data creation system (1) according to a sixth aspect, which may be implemented in conjunction with any one of the first to fifth aspects, the reference point (P1) is set at a middle of the first region (51) in an arrangement direction (first direction A1) of the first region (51) and the second region (52).

This aspect may further increase the variety of learning data.

In a data creation system (1) according to a seventh aspect, which may be implemented in conjunction with any one of the first to sixth aspects, the deformation about the height of the first region (51) is caused to allow the variation at the boundary (C1) to fall within a predefined range including zero.

This aspect may reduce the chances of causing a difference in height at the boundary (C1), thus reducing the chances of creating unreal image data.

In a data creation system (1) according to an eighth aspect, which may be implemented in conjunction with any one of the first to seventh aspects, the deformation about the height of the first region (51) is caused to allow a tilt angle at the boundary (C1) with respect to the reference plane (H1) to fall within a predetermined angular range including zero degrees.

This aspect may reduce the chances of forming an edge of the height at the boundary (C1), thus reducing the chances of creating unreal image data.

In a data creation system (1) according to a ninth aspect, which may be implemented in conjunction with any one of the first to eighth aspects, the deformation about the height of the first region (51) is caused in the following manner. Specifically, when any particular region (T1) showing a particular form is present in the first region (51) with respect to the boundary (C1), the deformation is caused to the first region (51) except the particular region (T1).

This aspect may reduce the chances of deforming the particular region (T1) in terms of its height.

In a data creation system (1) according to a tenth aspect, which may be implemented in conjunction with any one of the first to ninth aspects, the first region (51) is a pixel region representing a welding region formed by welding together two base materials (namely, a first base material B11 and a second base material B12) to be welded. The second region (52) is a pixel region representing any one of the two base materials.

This aspect may increase the variety of learning data about the welding region. Consequently, this contributes to improving the performance of recognizing the welding region.

In a data creation system (1) according to an eleventh aspect, which may be implemented in conjunction with any one of the first to tenth aspects, the processor (10) includes an acquirer (11) that acquires specification information to specify a location of the reference point (P1) in the first region (51).

This aspect may further increase the variety of learning data.

A data creation system (1A) according to a twelfth aspect creates, based on first image data (D11) and reference image data (D4), second image data (D12) for use as learning data to generate a learned model (M1) about an object (4). The data creation system (1A) includes a processor (10). The processor (10) generates, based on the first image data (D11) including a first region (51) as a pixel region representing the object (4) and a second region (52), the second image data (D12) by causing deformation about height of the second region (52) with respect to a first reference plane (J1). The second region (52) is adjacent to the first region (51). The processor (10) generates the second image data (D12) by causing deformation about height of the second region (52) with respect to the first reference plane (J1) based on height of a fourth region (54) of the reference image data (D4) with respect to a second reference plane (J2). The reference image data includes a third region (53) as a pixel region representing the object (4) and the fourth region (54). The fourth region (54) is adjacent to the third region (53). When a distance from an outer edge (X1) of the second region (52) to a first reference point (Q1) in the second region (52) is a first distance (L1), a distance from a boundary (C1) between the first region (51) and the second region (52) to the first reference point (Q1) is a second distance (L2), and a location where a ratio of the first distance (L1) to the second distance (L2) on the second reference plane (J2) is satisfied in the fourth region (54) of the reference image data (D4) is a second reference point (Q2), a variation at the first reference point (Q1) is a quantity based on height at the second reference point (Q2) with respect to the second reference plane (J2).

This aspect makes it easier to create second image data (D12) by causing deformation about the height of the second region (52) of the first image data (D11) based on the height of the fourth region (54) of the reference image data (D4). Consequently, this enables increasing the variety of learning data, thus contributing to improving the performance of recognizing the object (4).

A learning system (2) according to a thirteenth aspect generates the learned model (M1) using a learning data set. The learning data set includes the learning data as the second image data (D12) created by the data creation system (1) according to any one of the first to twelfth aspects.

This aspect enables providing a learning system (2) contributing to improving the performance of recognizing an object (4).

An estimation system (3) according to a fourteenth aspect estimates a particular condition of the object (4) as an object to be recognized using the learned model (M1) generated by the learning system (2) according to the thirteenth aspect.

This aspect enables providing an estimation system (3) contributing to improving the performance of recognizing an object (4).

A data creation method according to a fifteenth aspect is a method for creating, based on first image data (D11), second image data (D12) for use as learning data to generate a learned model (M1) about an object (4). The data creation method includes a processing step. The processing step includes generating, based on the first image data (D11) including a first region (51) as a pixel region representing the object (4) and a second region (52), the second image data (D12) by causing deformation about height of the first region (51) with respect to a reference plane (H1). The second region (52) is adjacent to the first region (51). The processing step includes generating the second image data (D12) such that the closer to a reference point (P1) within the first region (51) a point of interest is, the greater a variation in the height of the first region (51) with respect to the reference plane (H1) is and the closer to a boundary (C1) between the first region (51) and the second region (52) the point of interest is, the smaller the variation in the height of the first region (51) with respect to the reference plane (H1) is.

This aspect enables providing a data creation method contributing to improving the performance of recognizing an object (4).

A data creation method according to a sixteenth aspect is a method for creating, based on first image data (D11) and reference image data (D4), second image data (D12) for use as learning data to generate a learned model (M1) about an object (4). The data creation method includes a processing step. The processing step includes generating, based on the first image data (D11) including a first region (51) as a pixel region representing the object (4) and a second region (52), the second image data (D12) by causing deformation about height of the second region (52) with respect to a first reference plane (J1). The second region (52) is adjacent to the first region (51). The processing step includes generating the second image data (D12) by causing deformation about height of the second region (52) with respect to the first reference plane (J1) based on height of a fourth region (54) of the reference image data (D4) with respect to a second reference plane (J2). The reference image data (D4) includes a third region (53) as a pixel region representing the object (4) and the fourth region (54). The fourth region (54) is adjacent to the third region (53). When a distance from an outer edge (X1) of the second region (52) to a first reference point (Q1) in the second region (52) is a first distance (L1), a distance from a boundary (C1) between the first region (51) and the second region (52) to the first reference point (Q1) is a second distance (L2), and a location where a ratio of the first distance (L1) to the second distance (L2) on the second reference plane (J2) is satisfied in the fourth region (54) of the reference image data (D4) is a second reference point (Q2), a variation at the first reference point (Q1) is a quantity based on height at the second reference point (Q2) with respect to the second reference plane (J2).

This aspect enables providing a data creation method contributing to improving the performance of recognizing an object (4).

A program according to a seventeenth aspect is designed to cause one or more processors to perform the data creation method according to the fifteenth or sixteenth aspect.

This aspect enables providing a function contributing to improving the performance of recognizing an object (4).

A data creation system (1) according to an eighteenth aspect creates, based on first image data (D11), second image data (D12) for use as learning data to generate a learned model (M1) about an object (4). The data creation system (1) includes a determiner (13) and a deformer (12). The determiner (13) determines, with respect to the first image data (D11) including a first region (51) as a pixel region representing the object (4) and a second region (52) adjacent to the first region (51), a height variation as a variation in height of the first region (51) with respect to a reference plane (H1). The determiner (13) determines the height variation such that the closer to a reference point (P1) within the first region (51) a point of interest is, the greater the height variation is and the closer to a boundary (C1) between the first region (51) and the second region (52) the point of interest is, the smaller the height variation is. The deformer (12) generates, based on the height variation determined by the determiner (13), the second image data (D12) by causing deformation about the height of the first region (51) to the first image data (D11).

This aspect makes it easier to create second image data (D12) having either a mountain shape formed by increasing the height of the first region (51) of the first image data (D11) or a valley shape formed by decreasing the height of the first region (51) of the first image data (D11). Consequently, this enables increasing the variety of learning data, thus contributing to improving the performance of recognizing the object (4).

A data creation system (1) according to a nineteenth aspect, which may be implemented in conjunction with the eighteenth aspect, includes a first processing device (110) and a second processing device (120). The first processing device (110) includes the determiner (13). The second processing device (120) includes the deformer (12). The first processing device (110) transmits information (D20) indicating the height variation to the second processing device (120).

In a data creation system (1) according to a twentieth aspect, which may be implemented in conjunction with the nineteenth aspect, the first processing device (110) further includes a specifier (18) that specifies the reference point (P1) in the first image data (D11) in accordance with an operating command entered by a user.

A processing device according to a twenty-first aspect functions as the first processing device (110) of the data creation system (1) according to the nineteenth or twentieth aspect.

A processing device according to a twenty-second aspect functions as the second processing device (120) of the data creation system (1) according to the nineteenth or twentieth aspect.

An evaluation system (100) according to a twenty-third aspect includes a processing device (110) and a learning system (2). The processing device (110) determines, based on first image data (D11) including a first region (51) as a pixel region representing an object (4) and a second region (52) adjacent to the first region (51), a height variation as a variation in height of the first region (51) with respect to a reference plane (H1) such that the closer to a reference point (P1) within the first region (51) a point of interest is, the greater the height variation is and the closer to a boundary (C1) between the first region (51) and the second region (52) the point of interest is, the smaller the height variation is. The processing device (110) outputs information (D20) indicating the height variation thus determined. The learning system (2) generates a learned model (M1). The learned model (M1) outputs, in response to either second image data (D12) or the first region (51) in the second image data (D12), an estimation result similar to a situation where the first image data (D11) is subjected to estimation made about a particular condition of the object (4). The second image data (D12) is generated based on the height variation by causing deformation about the first region (51) to the first image data (D11).

An evaluation system (100) according to a twenty-fourth aspect includes a processing device (110) and an estimation system (3). The processing device (110) determines, based on first image data (D11) including a first region (51) as a pixel region representing an object (4) and a second region (52) adjacent to the first region (51), a height variation as a variation in height of the first region (51) with respect to a reference plane (H1) such that the closer to a reference point (P1) within the first region (51) a point of interest is, the greater the height variation is and the closer to a boundary (C1) between the first region (51) and the second region (52) the point of interest is, the smaller the height variation is. The processing device (110) outputs information (D20) indicating the height variation thus determined. The estimation system (3) estimates a particular condition of the object (4) as an object to be recognized using a learned model (M1). The learned model (M1) outputs, in response to either second image data (D12) or the first region (51) in the second image data (D12), an estimation result similar to a situation where the first image data (D11) is subjected to estimation made about the particular condition of the object (4). The second image data (D12) is generated based on the height variation by causing deformation about the first region (51) to the first image data (D11).

A data creation system (1A) according to a twenty-fifth aspect creates, based on first image data (D11) and reference image data (D4), second image data (D12) for use as learning data to generate a learned model (M1) about an object (4). The first image data (D11) includes: a first region (51) as a pixel region representing the object (4); a second region (52) adjacent to the first region (51); and a first reference plane (J1). The reference image data (D4) includes: a third region (53) as a pixel region representing the object (4); a fourth region (54) adjacent to the third region (53); and a second reference plane (J2). The data creation system (1A) includes a determiner (13A) and a deformer (12A). The determiner (13A) determines, based on height of the fourth region (54) of the reference image data (D4) with respect to the second reference plane (J2) of the reference image data (D4), a height variation as a variation in the height. The deformer (12A) generates, based on the height variation determined by the determiner (13A), the second image data (D12) by causing deformation about the height of the second region (52) with respect to the first reference plane (J1) to the first image data (D11). The determiner (13A) determines the height variation such that a variation at the first reference point (Q1) is a quantity based on height at the second reference point (Q2) with respect to the second reference plane (J2). The second reference point (Q2) is a location where a ratio of a first distance (L1) to a second distance (L2) on the second reference plane (J2) is satisfied in the fourth region (54) of the reference image data (D4). The first distance (L1) is a distance from an outer edge (X1) of the second region (52) to the first reference point (Q1) in the second region (52). The second distance (L2) is a distance from a boundary between the first region (51) and the second region (52) to the first reference point (Q1).

This aspect makes it easier to create second image data (D12) by causing deformation about the height of the second region (52) of the first image data (D11) based on the height of the fourth region (54) of the reference image data (D4). Consequently, this enables increasing the variety of learning data, thus contributing to improving the performance of recognizing the object (4).

A data creation system (1A) according to a twenty-sixth aspect, which may be implemented in conjunction with the twenty-fifth aspect, includes a first processing device (110A) and a second processing device (120A). The first processing device (110A) includes the determiner (13A). The second processing device (120A) includes the deformer (12A). The first processing device (110A) transmits information (D20A) indicating the height variation to the second processing device (120A).

In a data creation system (1A) according to a twenty-seventh aspect, which may be implemented in conjunction with the twenty-sixth aspect, the first processing device (110A) further includes a specifier (18) that specifies the first reference point (Q1) in the first image data (D11) in accordance with an operating command entered by a user.

A processing device according to a twenty-eighth aspect functions as the first processing device (110A) of the data creation system (1A) according to the twenty-sixth or twenty-seventh aspect.

A processing device according to a twenty-ninth aspect functions as the second processing device (120A) of the data creation system (1A) according to the twenty-sixth or twenty-seventh aspect.

An evaluation system (100) according to a thirtieth aspect includes a processing device (110A) and a learning system (2). The processing device (110A) determines, with respect to first image data (D11), including a first region (51) as a pixel region representing an object (4), a second region (52) adjacent to the first region (51), and a first reference plane (J1), and reference image data (D4), including a third region (53) as a pixel region representing the object (4), a fourth region (54) adjacent to the third region (53), and a second reference plane (J2), a height variation as a variation in the height based on height of the fourth region (54) with respect to the second reference plane (J2). The processing device (110) determines the height variation such that a variation at the first reference point (Q1) is a quantity based on height at the second reference point (Q2) with respect to the second reference plane (J2). The second reference point (Q2) is a location where a ratio of a first distance (L1) to a second distance (L2) on the second reference plane (J2) is satisfied in the fourth region (54) of the reference image data (D4). The first distance (L1) is a distance from an outer edge (X1) of the second region (52) to the first reference point (Q1) in the second region (52). The second distance (L2) is a distance from a boundary (C1) between the first region (51) and the second region (52) to the first reference point (Q1). The processing device (110A) outputs information (D20) indicating the height variation thus determined. The learning system (2) generates a learned model (M1). The learned model (M1) outputs, in response to either second image data (D12) or the first region (51) in the second image data (D12), an estimation result similar to a situation where the first image data (D11) is subjected to estimation made about a particular condition of the object (4). The second image data (D12) is generated based on the height variation by causing deformation about the second region (52) to the first image data (D11).

An evaluation system (100) according to a thirty-first aspect includes a processing device (110A) and an estimation system (3). The processing device (110A) determines, with respect to first image data (D11), including a first region (51) as a pixel region representing an object (4), a second region (52) adjacent to the first region (51), and a first reference plane (J1), and reference image data (D4), including a third region (53) as a pixel region representing the object (4), a fourth region (54) adjacent to the third region (53), and a second reference plane (J2), a height variation as a variation in height based on height of the fourth region (54) with respect to the second reference plane (J2). The processing device (110) determines the height variation such that a variation at the first reference point (Q1) is a quantity based on height at the second reference point (Q2) with respect to the second reference plane (J2). The second reference point (Q2) is a location where a ratio of a first distance (L1) to a second distance (L2) on the second reference plane (J2) is satisfied in the fourth region (54) of the reference image data (D4). The first distance (L1) is a distance from an outer edge (X1) of the second region (52) to the first reference point (Q1) in the second region (52). The second distance (L2) is a distance from a boundary (C1) between the first region (51) and the second region (52) to the first reference point (Q1). The processing device (110A) outputs information (D20) indicating the height variation thus determined. The estimation system (3) estimates a particular condition of the object (4) as an object to be recognized using a learned model (M1). The learned model (M1) outputs, in response to either second image data (D12) or the first region (51) in the second image data (D12), an estimation result similar to a situation where the first image data (D11) is subjected to estimation made about the particular condition of the object (4). The second image data (D12) is generated based on the height variation by causing deformation about the second region (52) to the first image data (D11).

Note that the constituent elements according to the second to eleventh aspects and the twentieth, twenty-sixth, and twenty-seventh aspects are not essential constituent elements for the data creation system (1) but may be omitted as appropriate.

REFERENCE SIGNS LIST

1, 1A Data Creation System
10 Processor
12, 12A Deformer
13, 13A Determiner
2 Learning System
3 Estimation System
4 Object
51 First Region
52 Second Region
53 Third Region
54 Fourth Region
100 Evaluation System
110, 110A First Processing Device
120, 120A Second Processing Device
B11 First Base Material (Base Material)
B12 Second Base Material (Base Material)
C1 Boundary
D11 First Image Data
D12 Second Image Data
D4 Reference Image Data
D20, D20A Information Indicating Height Variation
H1 Reference Plane
J1 First Reference Plane
J2 Second Reference Plane
L1 First Distance
L2 Second Distance
M1 Learned Model
P1 Reference Point
P2 Maximum Point
Q1 First Reference Point
Q2 Second Reference Point
T1 Particular Region
X1 Outer Edge

The invention claimed is:

1. A data creation system configured to create, based on first image data, second image data for use as learning data to generate a learned model about an object, the data creation system comprising:

a processor configured to generate, based on the first image data including a first region as a pixel region representing the object and a second region adjacent to the first region, the second image data by causing deformation about height of the first region such that the closer to a reference point within the first region a point of interest is, the greater a variation in the height of the first region with respect to a reference plane is and the closer to a boundary between the first region and the second region the point of interest is, the smaller the variation in the height of the first region with respect to the reference plane is.

2. The data creation system of claim 1, wherein the deformation about the height of the first region is caused to make a tilt angle at the reference point with respect to the reference plane fall within a predetermined angular range including zero degrees.

3. The data creation system of claim 1, wherein the reference point includes a plurality of reference points arranged side by side in a direction intersecting with an arrangement direction of the first region and the second region.

4. The data creation system of claim 1, wherein the deformation about the height of the first region is caused to allow height at the reference point with respect to the reference plane to go beyond a maximum point, of which height with respect to the reference plane is maximum within the first region before the deformation.

5. The data creation system of claim 1, wherein the deformation about the height of the first region is caused to allow height at the reference point with respect to the reference plane to come under a maximum point, of which height with respect to the reference plane is maximum within the first region before the deformation.

6. The data creation system of claim 1, wherein the reference point is set at a middle of the first region in an arrangement direction of the first region and the second region.

7. The data creation system of claim 1, wherein the deformation about the height of the first region is caused to allow the variation at the boundary to fall within a predefined range including zero.

8. The data creation system of claim 1, wherein the deformation about the height of the first region is caused to allow a tilt angle at the boundary with respect to the reference plane to fall within a predetermined angular range including zero degrees.

9. The data creation system of claim 1, wherein the deformation about the height of the first region is caused, when any particular region showing a particular form is present in the first region with respect to the boundary, to the first region except the particular region.

10. The data creation system of claim 1, wherein the first region is a pixel region representing a welding region formed by welding together two base materials to be welded, and the second region is a pixel region representing any one of the two base materials.

11. The data creation system of claim 1, wherein the processor includes an acquirer configured to acquire specification information to specify a location of the reference point in the first region.

12. A learning system configured to generate the learned model using a learning data set, the learning data set including the learning data as the second image data, the second image data being created by the data creation system of claim 1.

13. An estimation system configured to estimate a particular condition of the object as an object to be recognized using the learned model generated by the learning system of claim 12.

14. A data creation method for creating, based on first image data, second image data for use as learning data to generate a learned model about an object, the data creation method comprising:

a processing step including generating, based on the first image data including a first region as a pixel region representing the object and a second region adjacent to the first region, the second image data by causing deformation about height of the first region such that the closer to a reference point within the first region a point of interest is, the greater a variation in the height of the first region with respect to a reference plane is and the closer to a boundary between the first region and the second region the point of interest is, the smaller the variation in the height of the first region with respect to the reference plane is.

15. A non-transitory storage medium storing a program designed to cause one or more processors to perform the data creation method of claim 14.

16. A data creation system configured to create, based on first image data, second image data for use as learning data to generate a learned model about an object, the data creation system comprising:

a first processing device configured to determine, with respect to the first image data including a first region as a pixel region representing the object and a second region adjacent to the first region, a height variation as a variation in height of the first region with respect to a reference plane such that the closer to a reference point within the first region a point of interest is, the greater the height variation is and the closer to a boundary between the first region and the second region the point of interest is, the smaller the height variation is; and a second processing device configured to determine, based on the height variation determined by the determiner, the second image data by causing deformation about the height of the first region to the first image data.

17. The data creation system of claim 16, wherein the first processing device is configured to transmit information indicating the height variation to the second processing device.

18. The data creation system of claim 17, wherein the first processing device further includes a specifier configured to specify the reference point in the first image data in accordance with an operating command entered by a user.

19. The data creation system of claim 17, wherein the second processing device is configured to receive the information indicating the height variation.

20. An evaluation system comprising at least one processing device, wherein the at least one processing device is configured to;

determine, based on first image data including a first region as a pixel region representing an object and a second region adjacent to the first region, a height variation as a variation in height of the first region with respect to a reference plane such that the closer to a reference point within the first region a point of interest is, the greater the height variation is and the closer to a boundary between the first region and the second region the point of interest is, the smaller the height variation is; and output information indicating the height variation thus determined, and generate a learned model, the learned model being configured to output, in response to either second image data or a deformed first region included in the second image data corresponding to the first region of the first image data, an estimation result similar to a situation where the first image data is subjected to estimation made about a particular condition of the object, the second image data being generated based on the height variation by causing deformation about the first region to the first image data and the deformed first region being generated by deforming the first region.

21. An evaluation system comprising at least one processing device, wherein the at least one processing device is configured to:

determine, based on first image data including a first region as a pixel region representing an object and a second region adjacent to the first region, a height variation as a variation in height of the first region with respect to a reference plane such that the closer to a reference point within the first region a point of interest is, the greater the height variation is and the closer to a boundary between the first region and the second region the point of interest is, the smaller the height variation is; and output information indicating the height variation thus determined, to estimate a particular condition of the object as an object to be recognized using a learned model, and to output, in response to either second image data or a deformed first region in the second image data corresponding to the first region of the first image data, an estimation result similar to a situation where the first image data is subjected to estimation made about the particular condition of the object, the second image data being generated based on the height variation by causing deformation about the first region to the first image data and the deformed first region being generated by deforming the first region.

* * * * *